(12) United States Patent
Moribe et al.

(10) Patent No.: US 7,988,277 B2
(45) Date of Patent: Aug. 2, 2011

(54) INK SET, INK JET RECORDING METHOD, INK CARTRIDGE, RECORDING UNIT, INK JET RECORDING METHOD, AND AQUEOUS INK

(75) Inventors: Kenji Moribe, Fujisawa (JP); Satoshi Kudo, Kawasaki (JP); Mikio Sanada, Kawasaki (JP); Hideki Yamakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 496 days.

(21) Appl. No.: 12/116,343

(22) Filed: May 7, 2008

(65) Prior Publication Data
US 2008/0280043 A1 Nov. 13, 2008

(30) Foreign Application Priority Data

May 11, 2007 (JP) .................. 2007-126633
Apr. 23, 2008 (JP) .................. 2008-112758

(51) Int. Cl.
*G01D 11/00* (2006.01)

(52) U.S. Cl. .............. 347/100; 347/95; 106/31.27
(58) Field of Classification Search .............. 347/100, 347/95, 101, 96; 106/31.27, 31.13; 523/160, 523/161
See application file for complete search history.

(56) References Cited

U.S. PATENT DOCUMENTS

| | | | |
|---|---|---|---|
| 4,723,129 A | 2/1988 | Endo et al. | 346/1.1 |
| 4,740,796 A | 4/1988 | Endo et al. | 346/1.1 |
| 5,451,251 A | 9/1995 | Mafune et al. | 106/22 H |
| 5,571,313 A | 11/1996 | Mafune et al. | 106/22 H |
| 5,911,815 A | 6/1999 | Yamamoto et al. | 106/31.27 |
| 5,972,082 A * | 10/1999 | Koyano et al. | 106/31.27 |
| 6,027,210 A | 2/2000 | Kurabayashi et al. | 347/100 |
| 6,062,674 A | 5/2000 | Inui et al. | 347/43 |
| 6,174,354 B1 | 1/2001 | Takizawa et al. | 106/31.43 |
| 6,221,141 B1 | 4/2001 | Takada et al. | 106/31.6 |
| 6,231,652 B1 | 5/2001 | Koyano et al. | 106/31.27 |
| 6,280,513 B1 | 8/2001 | Osumi et al. | 106/31.6 |
| 6,332,919 B2 | 12/2001 | Osumi et al. | 106/31.6 |
| 6,375,317 B1 | 4/2002 | Osumi et al. | 347/100 |
| 6,425,662 B1 | 7/2002 | Teraoka et al. | 347/100 |
| 6,511,534 B1 | 1/2003 | Mishina et al. | 106/31.33 |
| 6,610,130 B2 | 8/2003 | Engel | 106/31.27 |
| 6,641,257 B1 | 11/2003 | Shi et al. | 347/100 |

(Continued)

FOREIGN PATENT DOCUMENTS

EP 1 004 641 A1 5/2000

(Continued)

*Primary Examiner* — Manish S Shah
(74) *Attorney, Agent, or Firm* — Fitzpatrick, Cella, Harper & Scinto

(57) ABSTRACT

An ink set is provided which can suppress bleeding irrespective of the type of recording medium. The ink set includes a plurality of aqueous inks each containing a dye, and has at least a first aqueous ink containing a dye, wherein the difference between the dynamic surface tension of the first aqueous ink at a lifetime of 50 milliseconds and the dynamic surface tension of the first aqueous ink at a lifetime of 500 milliseconds is 7 mN/m or more; and, between the first aqueous ink and at least one type of aqueous ink except the first aqueous ink included in the ink set, dynamic surface tension $\gamma_a$ (mN/m) of an ink A having relatively higher lightness at a lifetime of 500 milliseconds and dynamic surface tension $\gamma_b$ (mN/m) of an ink B having relatively lower lightness at a lifetime of 500 milliseconds satisfy $-5 \leq (\gamma_a - \gamma_b) \leq 3$.

14 Claims, 7 Drawing Sheets

U.S. PATENT DOCUMENTS

| | | | |
|---|---|---|---|
| 6,706,105 B2 | 3/2004 | Takada et al. | 106/31.6 |
| 7,005,461 B2 | 2/2006 | Sanada et al. | 523/160 |
| 7,037,362 B2 | 5/2006 | Honma et al. | 106/31.13 |
| 7,141,107 B2 * | 11/2006 | Honma et al. | 106/31.58 |
| 7,160,376 B2 | 1/2007 | Watanabe et al. | 106/31.6 |
| 7,208,033 B2 | 4/2007 | Kawabe et al. | 106/31.48 |
| 7,244,299 B2 | 7/2007 | Tsuji et al. | 106/31.48 |
| 7,247,192 B2 | 7/2007 | Ohira et al. | 106/31.27 |
| 7,276,110 B2 | 10/2007 | Tsujimura et al. | 106/31.27 |
| 7,276,112 B2 | 10/2007 | Tokuda et al. | 106/31.6 |
| 7,347,890 B2 | 3/2008 | Nito et al. | 106/31.27 |
| 7,371,274 B2 | 5/2008 | Sanada et al. | 106/31.27 |
| 2003/0130374 A1 | 7/2003 | Smith et al. | 523/160 |
| 2005/0263035 A1 | 12/2005 | Jung et al. | 106/31.58 |
| 2006/0066699 A1 | 3/2006 | Tokuda et al. | 347/100 |
| 2006/0089424 A1 | 4/2006 | Sanada et al. | 523/160 |
| 2006/0098067 A1 | 5/2006 | Imai et al. | 347/100 |
| 2006/0098068 A1 | 5/2006 | Hakamada et al. | 347/100 |
| 2006/0103704 A1 | 5/2006 | Hakamada et al. | 347/100 |
| 2006/0135647 A1 | 6/2006 | Ichinose et al. | 523/160 |
| 2006/0192828 A1 | 8/2006 | Ohira et al. | 347/100 |
| 2007/0148376 A1 | 6/2007 | Tomioka et al. | 428/32.1 |
| 2007/0252868 A1 | 11/2007 | Sanada et al. | 347/33 |
| 2007/0252881 A1 | 11/2007 | Sanada et al. | 347/100 |
| 2008/0018722 A1 | 1/2008 | Mafune et al. | 347/100 |
| 2008/0106581 A1 | 5/2008 | Sanada et al. | 347/86 |
| 2008/0151028 A1 | 6/2008 | Yamakami et al. | 347/100 |
| 2010/0225707 A1 * | 9/2010 | Kudo et al. | 347/100 |

FOREIGN PATENT DOCUMENTS

| | | |
|---|---|---|
| EP | 1 085 062 A2 | 3/2001 |
| EP | 1 182 237 A2 | 2/2002 |
| EP | 1 186 413 A2 | 3/2002 |
| JP | S63-213581 | 9/1988 |
| JP | 9-296139 | 11/1997 |
| JP | 2003-231838 | 8/2003 |
| JP | 2004-083621 | 3/2004 |
| JP | 2006-063322 | 3/2006 |
| WO | WO 2007/120703 A2 | 10/2007 |

* cited by examiner

INK SET, INK JET RECORDING METHOD, INK CARTRIDGE, RECORDING UNIT, INK JET RECORDING METHOD, AND AQUEOUS INK

BACKGROUND OF THE INVENTION

1. Field of the Invention

The present invention relates to an aqueous ink, an ink set, an ink jet recording method, an ink cartridge, a recording unit, and an ink jet recording method.

2. Description of the Related Art

In recent years, it is demanded to improve the image quality, specifically, the gradation or color uniformity of an image formed on a recording medium, in particular, plain paper by an ink jet recording method. For example, the gradation can be improved by reducing the area of one dot formed from ink on the recording medium. In contrast, when the area of one dot is large, a plurality of dots are apt to link with each other, so it may be unable to strictly control the area of the surface of the recording medium coated with the ink even when the amount of the ink to be applied per unit area is increased or decreased. In addition, a plurality of dots is apt to link with each other, so the blurring of the ink is apt to occur on the recording medium in some cases.

In order to solve such problems, there are proposals that the blurring of ink on a recording medium is suppressed by enlarging the static surface tension (the so-called "surface tension") of the ink. For example, the proposal that the blurring of ink is suppressed by setting the surface tension of the ink at 20° C. to be 45 mN/m or more, has been made (see Japanese Patent Application Laid-Open No. S63-213581). The proposal that the blurring of ink is suppressed by setting the surface tension of the ink to be 40 mN/m or more, has also been made (see Japanese Patent Application Laid-Open No. 2004-83621).

In addition, a proposal in which attention is focused on the dynamic surface tension of ink has been made to serve as a technology for controlling, for example, the blurring or permeation of the ink on or into a recording medium. For example, the following proposal has been made (see Japanese Patent Application Laid-Open No. H09-296139): the blurring of ink is suppressed by setting the surface tension of the ink in a bubble period T (second/bubble) of 0.2 or less to be 40 mN/m or more, and the ejection reliability of the ink is improved by setting the surface tension of the ink in a bubble period T (second/bubble) of more than 1 to be less than 50 mN/m.

The following proposal has also been made (see Japanese Patent Application Laid-Open No. 2003-231838): the ejection reliability of ink is improved by setting the dry viscosity of the ink to be 100 mPa·s or less, and the dynamic surface tension characteristic of the ink at a specific lifetime is specified. To be specific, it is described in the document that the blurring of the ink is suppressed by setting the dynamic surface tension of the ink at a lifetime of 10 milliseconds to 45 mN/m or more, and the quick-drying property of the ink is improved by setting the dynamic surface tension of the ink at a lifetime of 1,000 milliseconds to be 35 mN/m or less.

Further, a proposal in which attention is focused on the relationship between the dynamic surface tensions of a plurality of inks of which an ink set is composed has been made to serve as a technology for controlling, for example, the blurring or permeation of different colors on plain paper (see Japanese Patent Application Laid-Open No. 2006-63322). That is, in the ink set composed of black, yellow, magenta, and cyan inks, the dynamic surface tensions of the respective inks at a temperature of 25° C. and the same lifetime in the lifetime range of 30 milliseconds to 1,000 milliseconds by a maximum bubble pressure method are specified as follows: (1) the dynamic surface tension of the yellow ink is equal to or larger than that of the black ink, (2) a difference in dynamic surface tension between the yellow ink and the black ink is 5 mN/m or less, (3) a difference in dynamic surface tension between the yellow ink and the magenta ink, and a difference in dynamic surface tension between the yellow ink and the cyan ink are each 3 mN/m or more, and (4) the dynamic surface tension of each of the magenta ink and the cyan ink is lower than that of the black ink. In the document, it is described that those specifications prevent different colors from mixing with each other at a boundary portion between them on plain paper.

SUMMARY OF THE INVENTION

However, merely increasing the static surface tension of ink as in the invention described in each of Japanese Patent Application Laid-Open No. S63-213581 and Japanese Patent Application Laid-Open No. 2004-83621 cited above is unable to suppress the blurring of the ink in some cases, or is unable to wet the surface of a recording medium uniformly, so the color uniformity of an image is lowered in some cases. In addition, an increase in the static surface tension of ink reduces the permeability of the ink into the recording medium, so it takes a long time for the ink to finish permeating into the recording medium, and hence ink migration or the like occurs in some cases.

In addition, in the invention described in each of Japanese Patent Application Laid-Open No. H09-296139, Japanese Patent Application Laid-Open No. 2003-231838, and Japanese Patent Application Laid-Open No. 2006-63322 cited above, attempts have been made in which attention is concentrated on a change in dynamic surface tension of ink to control the blurring or permeation of the ink. However, the investigation conducted by the inventors of the present invention has shown that none of the specifications concerning the dynamic surface tension described in Japanese Patent Application Laid-Open No. H09-296139, Japanese Patent Application Laid-Open No. 2003-231838, and Japanese Patent Application Laid-Open No. 2006-63322 can improve the gradation of an image while maintaining color uniformity in the image when plain paper or the like is used as a recording medium. In other words, an ink capable of forming such ideal dots as described below has not been present in which, when plain paper or the like is used as a recording medium, the spread of the ink in a lateral direction (gradation) and color uniformity (the uniform wetting of the surface of the recording medium with the ink) are appropriately controlled.

In view of the foregoing, the inventors of the present invention have made investigation into an ink capable of solving the above problems by concentrating attention on the behavior of the ink during a period commencing on the application of the ink to a recording medium and ending on the completion of the permeation of the ink into the recording medium with the dynamic surface tension of the ink appropriately controlled when plain paper or the like is used as the recording medium. As a result, it has been found that even in the case of an ink capable of providing an excellent image when plain paper or the like is used as a recording medium, a new problem will emerge when the ink is used in an ink set. To be specific, it has been found that when an image is formed on, for example, a recording medium having an ink-receiving layer by using the ink set including the ink, bleeding that did not occur in a recording medium such as plain paper occurs in an unexpectedly conspicuous state.

Therefore, the first object of the present invention is to provide an ink set including inks with their dynamic surface tensions controlled, the ink set being capable of suppressing bleeding in, for example, a recording medium having an ink-receiving layer. In addition, the second object of the present invention is to provide an ink set including aqueous inks capable of improving gradation while maintaining color uniformity when plain paper or the like is used as a recording medium, the ink set being capable of suppressing bleeding in, for example, a recording medium having an ink-receiving layer. In addition, another object of the present invention is to provide an ink jet recording method, an ink cartridge, a recording unit, and an ink jet recording method each using the aqueous inks of which the ink set is composed. In addition, another object of the present invention is to provide aqueous inks for use in an ink set capable of suppressing bleeding in, for example, a recording medium having an ink-receiving layer.

The above object can be achieved by the following present invention. That is, an ink set according to the first embodiment of the present invention is an ink set including a plurality of aqueous inks each containing a dye, in which: the ink set has at least a first aqueous ink containing a dye; the difference between dynamic surface tension of the first aqueous ink at a lifetime of 50 milliseconds and dynamic surface tension of the first aqueous ink at a lifetime of 500 milliseconds is 7 mN/m or more; and, between the first aqueous ink and at least one type of aqueous ink except the first aqueous ink included in the ink set, dynamic surface tension $\gamma_a$ (mN/m) of an ink A having relatively higher lightness at a lifetime of 500 milliseconds and dynamic surface tension $\gamma_b$ (mN/m) of an ink B having relatively lower lightness at a lifetime of 500 milliseconds satisfy a relationship of $-5 \leq (\gamma_a - \gamma_b) \leq 3$.

In addition, an ink set according to the second embodiment of the present invention includes a plurality of aqueous inks each containing a dye, in which: the ink set has at least a first aqueous ink containing a dye; the first aqueous ink satisfies the following conditions (1) to (3): (1) dynamic surface tension at a lifetime of 50 milliseconds is from 42 mN/m or more to less than 49 mN/m, (2) dynamic surface tension at a lifetime of 500 milliseconds is from 28 mN/m or more to 38 mN/m or less, and (3) the difference between dynamic surface tension at a lifetime of 50 milliseconds and dynamic surface tension at a lifetime of 500 milliseconds is 7 mN/m or more; and, between the first aqueous ink and at least one type of aqueous ink except the first aqueous ink included in the ink set, dynamic surface tension $\gamma_a$ (mN/m) of an ink A having a relatively higher lightness at a lifetime of 500 milliseconds and dynamic surface tension $\gamma_b$ (mN/m) of an ink B having a relatively lower lightness at a lifetime of 500 milliseconds satisfy a relationship of $-5 \leq (\gamma_a - \gamma_b) \leq 3$.

In addition, an ink set according to the third embodiment of the present invention includes at least three types of aqueous inks each containing a dye, in which: the ink set has at least a first aqueous ink containing a dye; the first aqueous ink satisfies the following conditions (1) to (3): (1) dynamic surface tension at a lifetime of 50 milliseconds is from 42 mN/m or more to less than 49 mN/m, (2) dynamic surface tension at a lifetime of 500 milliseconds is from 28 mN/m or more to 38 mN/m or less, and (3) the difference between dynamic surface tension at a lifetime of 50 milliseconds and dynamic surface tension at a lifetime of 500 milliseconds is 7 mN/m or more; and, among any two types of aqueous inks arbitrarily selected from the at least three types of aqueous inks included in the ink set, dynamic surface tension $\gamma_a$ (mN/m) of an ink A having a relatively higher lightness at a lifetime of 500 milliseconds and dynamic surface tension $\gamma_b$ (mN/m) of an ink B having a relatively low lightness at a lifetime of 500 milliseconds satisfy a relationship of $-5 \leq (\gamma_a - \gamma_b) \leq 3$.

In addition, an ink jet recording method according to another embodiment of the present invention includes ejecting ink by an ink jet method, in which the ink includes the aqueous inks of which the ink set is composed.

In addition, an ink cartridge according to still another embodiment of the present invention includes an ink storing portion for storing ink, in which the ink contained in the ink storing portion is any one of the aqueous inks of which the ink set is composed.

In addition, a recording unit according to still another embodiment of the present invention includes an ink storing portion for storing ink and a recording head for ejecting the ink, in which the ink contained in the ink storing portion includes the aqueous inks of which the ink set is composed.

In addition, an ink jet recording apparatus according to still another embodiment of the present invention includes an ink storing portion for storing ink and a recording head for ejecting the ink, in which the ink contained in the ink storing portion includes the aqueous inks of which the ink set is composed.

In addition, an ink according to still another embodiment of the present invention is a first aqueous ink which includes a dye and is used for an ink set having a plurality of aqueous inks each containing a dye, in which the difference between dynamic surface tension at a lifetime of 50 milliseconds of the first aqueous ink and dynamic surface tension at a lifetime of 500 milliseconds of the first aqueous ink is 7 mN/m or more; and, between the first aqueous ink and at least one type of aqueous ink except the first aqueous ink included in the ink set, dynamic surface tension $\gamma_a$ (mN/m) of an ink A having a relatively higher lightness at a lifetime of 500 milliseconds and dynamic surface tension $\gamma_b$ (mN/m) of an ink B having a relatively lower lightness at a lifetime of 500 milliseconds satisfy a relationship of $-5 \leq (\gamma_a - \gamma_b) \leq 3$.

According to the present invention, an ink set can be provided including inks with their dynamic surface tensions controlled, the ink set being capable of suppressing bleeding in, for example, a recording medium having an ink-receiving layer. In addition, according to the present invention, an ink set can be provided including aqueous inks capable of improving gradation while maintaining color uniformity when plain paper or the like is used as a recording medium, the ink set being capable of suppressing bleeding in, for example, a recording medium having an ink-receiving layer. In addition, the present invention can provide an ink cartridge, a recording unit, and an ink jet recording method each using the aqueous inks of which the ink set is composed. In addition, the present invention can provide aqueous inks for use in an ink set capable of suppressing bleeding in, for example, a recording medium having an ink-receiving layer.

Further features of the present invention will become apparent from the following description of exemplary embodiments with reference to the attached drawings.

DESCRIPTION OF THE EMBODIMENTS

Figure 1:
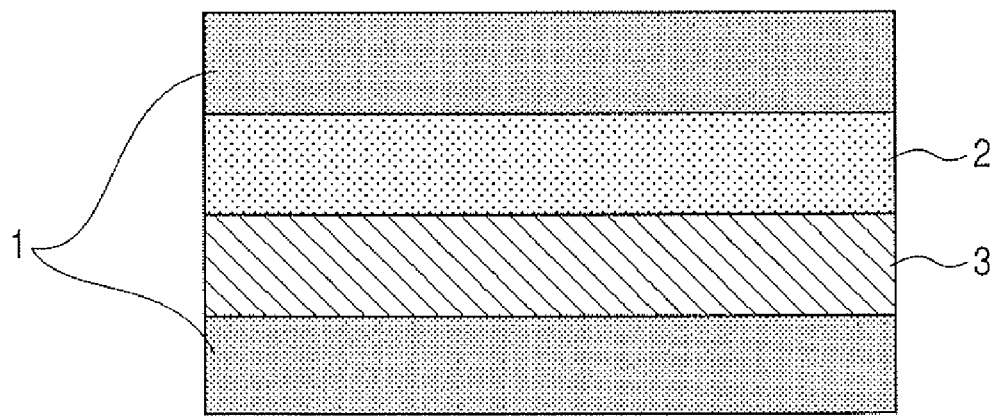
FIG. 1 is a model view of an image to be formed for evaluation for bleeding.

Hereinafter, the present invention will be described in more detail by way of the best mode for carrying out the invention. It should be noted that, in the following description, an aqueous ink is referred to also as "ink", and a first aqueous ink is referred to also as "first ink". In addition, the term "bleeding" as used in the present invention refers to unintended bleeding occurring at a boundary portion between images formed by using a plurality of inks each containing a dye in an aqueous ink set when these images are adjacent to each other.

First, the maximum bubble pressure method used in the measurement of the dynamic surface tension in the present invention is a method described below. Specifically, the maximum bubble pressure method is a method that a maximum pressure required to release a bubble formed at a tip portion of a probe (capillary) dipped in a liquid to be measured is measured, and a surface tension is found from this maximum pressure. The lifetime (surface age) means a time from a point of time a surface of a new bubble is formed after a bubble has been released from the tip portion to a point of time of a maximum bubble pressure (a point of time the curvature radius of the bubble becomes equal to the radius of the tip portion of the probe) upon the formation of the bubble at the tip portion of the probe in the maximum bubble pressure method. The dynamic surface tension in the present invention is a value measured at 25° C.

The first object of the present invention, i.e., the suppression of bleeding occurring remarkably when an image is formed on, for example, a recording medium having an ink-receiving layer by using an ink set including inks with their dynamic surface tensions controlled will be described below. The inventors of the present invention have conducted investigation into the above bleeding by using various inks prepared so as to differ from each other in characteristic in which dynamic surface tension changes. As a result, the inventors have found that bleeding occurs remarkably when an image is formed on, for example, a recording medium having an ink-receiving layer by using an ink set including inks with some dynamic surface tension characteristics. To be specific, the inventors have found that bleeding occurs in an unexpectedly conspicuous state in an ink set including an ink the dynamic surface tension of which changes to such a large extent that the difference between the dynamic surface tension of the ink at a lifetime of 50 milliseconds and the dynamic surface tension of the ink at a lifetime of 500 milliseconds is 7 mN/m or more.

It has been conventionally known to the public that the static surface tensions of a plurality of inks should be uniformized in order that the inks may be identical to each other in permeability into a recording medium. In actuality, bleeding can be suppressed thereby. However, when an ink the dynamic surface tension of which largely changes and inks with their static surface tensions uniformized are used in an ink set, bleeding occurs remarkably upon formation of an image on a recording medium having an ink-receiving layer. In view of the foregoing, the inventors of the present invention have conducted investigation into the reason why bleeding occurs particularly remarkably in, for example, a recording medium having an ink-receiving layer.

The mechanism via which bleeding occurs will be discussed. Since a large number of relatively large voids are present in plain paper, the surface of the plain paper is wet by application of ink, whereby the ink is taken in the voids, and the motion of the ink is restrained to some extent. Accordingly, when plain paper or the like is used as a recording medium, a relationship between the physical properties of a plurality of inks has a limitative influence on bleeding. In other words, when plain paper or the like is used as a recording medium, it is extremely important for suppressing bleeding that the wettability between each of a plurality of inks constituting an ink set and plain paper and the extent of blurring in each of the inks are appropriately determined.

On the other hand, a recording medium having an ink-receiving layer has an extremely small void, and the void is present as a pore, so the permeation of ink into the recording medium having an ink-receiving layer occurs via a capillary action. Accordingly, the phenomenon occurring in this case is largely different from that occurring in the case where plain paper or the like is used as a recording medium.

The inventors of the present invention have conducted investigation into the behavior of ink when, for example, a recording medium having an ink-receiving layer is used during a period commencing on the application of the ink to the recording medium and ending on the permeation of the ink into the recording medium. As described above, the permeation of the ink into the recording medium having an ink-receiving layer occurs via a capillary action. In addition, it has been generally known that, when a liquid has sufficient wettability for the wall surface of a capillary, capillary force is proportional to the surface tension of the liquid. In view of the foregoing, as indicated by the conventional finding, uniformizing the static surface tensions of a plurality of inks constituting an ink set is formed suffices for the suppression of bleeding occurring remarkably when, for example, a recording medium having an ink-receiving layer is used. However, it can be found that the above model does not hold true for an ink set including an ink the dynamic surface tension of which largely changes because bleeding occurs in an unexpectedly conspicuous state in the ink set as described above.

The inventors of the present invention have considered the phenomenon to be as described below. Upon permeation of ink into a void in a recording medium having an ink-receiving layer, a site where the gas-liquid interface of the ink and the wall surface of the void in the recording medium are brought into contact with each other, in other words, a site where capillary force is exerted is renewed at all times during movement of the ink. Accordingly, a surface tension that exerts the capillary force may correspond to not the static surface tension of the ink but the dynamic surface tension of the ink at a certain lifetime. On the basis of such hypothesis, the inventors of the present invention have conducted investigation into the lifetime of dynamic surface tension that affects capillary force during movement of an ink in a void in a recording medium having an ink-receiving layer by using various ink sets including inks different from each other in characteristic in which a dynamic surface tension changes. As a result, the inventors have found that the dynamic surface tension of the ink at a lifetime of 500 milliseconds rather than the static surface tension of the ink is dominant in an influence on the behavior of the ink at that time. To be more specific, the inventors have found that, between two types of inks, an ink having lower dynamic surface tension at a lifetime of 500 milliseconds flows into an ink having higher dynamic surface tension at a lifetime of 500 milliseconds, with the result that bleeding occurs.

In other words, when a plurality of inks come in contact with each other in a state in which the inks have not finished permeating into a recording medium having an ink-receiving layer, the following phenomenon occurs. To be specific, a phenomenon occurs such that an ink having high permeability, i.e., an ink having relatively higher dynamic surface tension at a lifetime of 500 milliseconds "attracts" an ink having lower permeability, i.e., an ink having relatively lower dynamic surface tension at a lifetime of 500 milliseconds. Thus, bleeding occurs.

Accordingly, an ideal approach to suppressing bleeding is to set the dynamic surface tensions of two types of inks at a lifetime of 500 milliseconds to be equal to each other. However, when a difference in dynamic surface tension at a lifetime of 500 milliseconds between the two types of the inks is extremely small, no such bleeding as to be substantially observed with the eyes is considered to occur.

In view of the foregoing, the inventors of the present invention have conducted investigation into a relationship between the threshold value of a difference in dynamic surface tension at a lifetime of 500 milliseconds and the extent of bleeding by using various ink sets. As a result, the inventors have found that setting a difference in dynamic surface tension at a lifetime of 500 milliseconds between two types of inks to 3 mN/m or less suffices for the suppression of such bleeding as to be substantially observed with the eyes. Further investigation conducted by the inventors of the present invention has shown that a relationship between the tinges of the inks is also involved in the occurrence of bleeding, and lightness of the three attributes (hue, lightness, and chroma) of a color quantitatively representing a tinge is largely involved in the occurrence. To be specific, the dynamic surface tension of an ink A having relatively higher lightness at a lifetime of 500 milliseconds is represented by $\gamma_a$ (mN/m), and the dynamic surface tension of an ink B having relatively lower lightness at a lifetime of 500 milliseconds is represented by $\gamma_b$ (mN/m). In that case, the inventors have found that bleeding can be suppressed when $\gamma_a$ (mN/m) described above and $\gamma_b$ (mN/m) described above satisfy the condition of $-5 \leq (\gamma_a - \gamma_b) \leq 3$. In the present invention, $\gamma_a$ and $\gamma_b$ more preferably satisfy the condition of $-3 \leq (\gamma_a - \gamma_b) \leq 3$, or particularly preferably satisfy the condition of $-3 \leq (\gamma_a - \gamma_b) \leq 3$.

The foregoing means that the threshold value of the difference in dynamic surface tension at a lifetime of 500 milliseconds between two types of inks with which bleeding can be suppressed varies depending on a relative lightness relationship between the two types of the inks. This is due to the following reasons. Bleeding occurring when an ink having a relatively high lightness flows into an ink having relatively lower lightness is difficult to observe with the eyes, so some degree of increase in difference in dynamic surface tension at a lifetime of 500 milliseconds between the inks is accepted. In contrast, bleeding occurring when the ink having relatively low lightness flows into the ink having a relatively high lightness is easy to observe with the eyes, so the difference in dynamic surface tension at a lifetime of 500 milliseconds between the inks must be controlled so as to be small.

In the present invention, the lightness of each of the inks of which the ink set is composed must be measured while the same recording medium and the same recording duty are adopted for the inks. Any recording medium can be used as the recording medium as long as the recording medium is applicable to an ordinary ink jet recording apparatus, and has an ink-receiving layer. Then, solid images in which the amounts of the respective inks of which the ink set is composed to be applied are uniformized are formed on the recording medium by using the inks, and the image portion is subjected to color measurement with, for example, a spectrophotometer, whereby a value for the lightness of each of the inks can be obtained. Upon formation of the solid images, the inks are preferably applied in amounts enough to coat the entirety of the surface of the recording medium. In the present invention, for example, a PR-101 (manufactured by Canon Inc.) can be used as a recording medium having an ink-receiving layer. In addition, the color measurement can be performed with, for example, a spectrophotometer (trade name: Spectrolino; manufactured by Gretag Macbeth). Further, the amount of each ink to be applied is preferably, for example, about 10 ng per one pixel at a resolution of 600 ppi. The present invention is, of course, not limited to such a recording medium, a spectrophotometer, and amounts of inks to be applied as described above.

The inventors of the present invention have conducted investigation into conditions specified for suppressing bleeding in the present invention. To be specific, the inventors have confirmed the following for a relative lightness relationship specified between two types of inks, the ink A and the ink B, of the a plurality of inks of which the ink set is composed, and a relative relationship specified between the dynamic surface tensions of the two types of the inks at a lifetime of 500 milliseconds. That is, the inventors have confirmed that, as long as the conditions specified by the present invention are satisfied, bleeding performance does not depend on: the amount of each of the ink A and the ink B to be applied per unit area; the order in which the ink A and the ink B are applied to a recording medium; or the number of recording paths of each of the inks.

When the two types of the inks are largely different from each other in amount to be applied, for example, when the amount of the ink B having relatively lower lightness to be applied is smaller than the amount of the ink A having relatively higher lightness to be applied, a lightness relationship between the images formed from the ink A and the ink B may be reversed as compared with that in the case where the two types of the inks are not largely different from each other in amount to be applied. However, when the lightness relationship between the respective images formed under the above predetermined conditions is reversed depending on whether the amount of each ink to be applied is large or small despite the fact that inks corresponding to the ink A and the ink B are determined from the lightness relationship, no such bleeding as to be observed with the eyes occurs. This is because of the following reason: the amount of one of the inks to be applied is sufficiently small, so a time period required for the ink to finish permeating into a recording medium is also sufficiently short, and, from the beginning, it is difficult for bleeding to occur. Accordingly, it can be said that unacceptable bleeding does not occur as long as the condition of $-5 \leq (\gamma_a - \gamma_b) \leq 3$ is satisfied.

As described above, a relationship between the dynamic surface tensions of a plurality of inks at a lifetime of 500 milliseconds and a lightness relationship between the inks are dominant in the occurrence of bleeding, so there is no need to take a hue or chroma relationship between the a plurality of inks into consideration. In other words, a relationship between the dynamic surface tensions of a plurality of inks at a lifetime of 500 milliseconds and a lightness relationship between the inks specified by the present invention for suppressing bleeding are similarly applicable to various inks. That is, the specifications of the present invention are applicable to each of, for example, black, red, green, blue, light cyan, light magenta, and gray inks as well as each of cyan, magenta, and yellow inks used in an ordinary ink jet recording system. Further, the specifications of the present invention are applicable also to, for example, a clear ink used for improving, for example, the gloss and fastness of an image. Examples concerning those respective inks are not listed here, but are included in the present invention. In the present invention, it is more preferable that the ink A and the ink B described above are a magenta ink and a cyan ink, respectively. The present invention is, of course, not limited to the foregoing.

The summary of the foregoing description will be given below. An ink set according to the first embodiment of the present invention has the following constitution. That is, the ink set, which has a plurality of inks each containing a dye, has at least an ink in which the difference between the dynamic surface tension of the ink at a lifetime of 50 milliseconds and the dynamic surface tension of the ink at a lifetime of 500 milliseconds is 7 mN/m or more (hereinafter referred to as "first ink"). In addition, an ink having relatively higher lightness between the first ink and at least one type of ink except the first aqueous ink included in the ink set is defined as an ink A, and an ink having relatively lower lightness between the first ink and the at least one type of ink is defined as an ink B. In this case, the dynamic surface tension $\gamma_a$ (mN/m) of the ink A at a lifetime of 500 milliseconds and the dynamic surface tension $\gamma_b$ (mN/m) of the ink B at a lifetime of 500 milliseconds must satisfy the relationship of $-5 \leq (\gamma_a - \gamma_b) \leq 3$.

The inventors of the present invention have conducted further investigation into the first object of the present invention. As a result, the inventors have reached the conclusion that, based on the lightness of the ink, it is possible to technically settle the bleeding problem occurring when the first ink is used in which the difference between the dynamic surface tension of the ink at a lifetime of 50 milliseconds and the dynamic surface tension of the ink at a lifetime of 500 milliseconds is 7 mN/m or more.

That is, an ink according to another embodiment of the present invention has the following constitution. That is, the ink is a first ink which contains a dye and is used for an ink set having a plurality of inks each containing a dye, in which the difference between the dynamic surface tension of the ink at a lifetime of 50 milliseconds and the dynamic surface tension of the ink at a lifetime of 500 milliseconds is 7 mN/m or more. In addition, an ink having relatively higher lightness between the first ink and at least one type of ink except the first aqueous ink included in the ink set is defined as an ink A, and an ink having relatively lower lightness between the first ink and the at least one type of ink is defined as an ink B. In this case, the dynamic surface tension $\gamma_a$ (mN/m) of the ink A at a lifetime of 500 milliseconds and the dynamic surface tension $\gamma_b$ (mN/m) of the ink B at a lifetime of 500 milliseconds must satisfy the relationship of $-5 \leq (\gamma_a - \gamma_b) \leq 3$.

Next, the second object of the present invention, that is, the suppression of the above bleeding and an improvement in gradation while color uniformity is maintained when plain paper or the like is used as a recording medium, will be described below.

One technical idea for achieving the above second object is as follows: in order that the gradation of an image can be improved by controlling the area of one dot to be proper, the spread of ink immediately after application of the ink to a recording medium is suppressed, and, furthermore, the ink is caused to permeate quickly into the recording medium while the spread of the ink is suppressed. In addition, another technical idea for achieving the above second object is to impart to the ink wettability sufficient for voids present between fibers from which the recording medium is formed in order that color uniformity in the image can be improved.

The inventors of the present invention have conducted the following investigation into a state that ink spreads on a recording medium. First, the inventors have prepared various inks different from each other in characteristic in which dynamic surface tension changes with a lifetime, and have recorded a one-dot ruled line on each of various recording media such as plain paper by using each of those inks. Then, the inventors have investigated a relationship between the line width of the ruled line and each of the dynamic surface tension and static surface tension of each of the inks from a lifetime of 10 milliseconds to a lifetime of 5,000 milliseconds. As a result, the inventors have found that the line width of the ruled line and the dynamic surface tension of each of the inks at a lifetime of 50 milliseconds show the strongest correlation with each other in each of all types of investigated recording media. In addition, the inventors have found that the correlation continuously weakens as a lifetime deviates forward or backward from a lifetime of 50 milliseconds as a center. In view of the foregoing, the inventors of the present invention have gained the knowledge that investigation into the dynamic surface tension of each of the inks at a lifetime of 50 milliseconds enables the line width of the ruled line, that is, a state that the ink spreads on each of the recording media, to be specified. In the above investigation, the line width of the ruled line is measured after a recorded matter has been left standing overnight.

In view of the foregoing, the inventors of the present invention have conducted further investigation while concentrating attention on the dynamic surface tension characteristic of each of the inks at a lifetime of 50 milliseconds. To be specific, the inventors have prepared inks with their dynamic surface tensions at a lifetime of 50 milliseconds variously changed, have formed an image by using each of these inks, and have investigated a relationship between gradation in the resultant image and the dynamic surface tension of each of the inks at a lifetime of 50 milliseconds. As a result, the inventors have gained the knowledge that when setting the dynamic surface tension of each of the inks at a lifetime of 50 milliseconds to be 42 mN/m or more, the excessive spread of each of the inks on a recording medium can be suppressed.

The inventors of the present invention consider the reason why there is a high correlation between a state where ink spreads on a recording medium and the dynamic surface tension of the ink at a lifetime of 50 milliseconds to be as described below. That is, at a time point of 50 milliseconds from the application of the ink to the recording medium, at least part of the ink permeates into a region near the surface of the recording medium, and the region is one important factor for determining the area of one dot formed from the ink on the recording medium. In addition, a change in the contact angle between the ink and the recording medium due to a change in the value of the dynamic surface tension of the ink after application of the ink to the recording medium is considered also to be a factor for determining the area of one dot formed of the ink on the recording medium. Further, evaporation of, for example, moisture in the ink immediately after being applied onto the recording medium occurs relatively more frequently as compared with the ink permeating in the thickness direction of the recording medium. The amount in which the ink permeates in the thickness direction of the recording medium is considered to depend also on the dynamic surface tension of the ink at a lifetime of 50 milliseconds, and the dependence is considered also to be another important factor for determining the area of one dot formed of the ink on the recording medium.

However, when the ink continues to maintain high surface tension for a long time period, permeation of the ink in the thickness direction of the recording medium does not proceed, with the result that the ink spreads on the surface of the recording medium, and gradation is reduced in some cases. Investigation conducted by the inventors of the present invention has shown that the following procedure is effective in suppressing a reduction in gradation. First, the excessive spread of the ink on the recording medium is suppressed by increasing the dynamic surface tension of the ink at a lifetime of 50 milliseconds. After that, the dynamic surface tension of the ink is abruptly reduced so that permeation of the ink in the thickness direction of the recording medium is promoted, whereby the spread of the ink on the surface of the recording medium is additionally suppressed. Thus, the area of one dot formed from the ink on the recording medium can be made appropriate. Investigation conducted by the inventors of the present invention has shown that, to be specific, a reduction in dynamic surface tension of the ink by 7 or more in the lifetime range of 50 milliseconds to 500 milliseconds suffices for the occurrence of such a phenomenon.

As a result, the inventors of the present invention have found that an ink having the following characteristics provides excellent image gradation: the ink has a dynamic surface tension of 42 mN/m or more at a lifetime of 50 milliseconds, and the difference between the dynamic surface tension of the ink at a lifetime of 50 milliseconds and the dynamic surface tension of the ink at a lifetime of 500 milliseconds is 7 mN/m or more. Further, the gradation can be particularly improved when the difference between the dynamic surface tension of the ink at a lifetime of 50 milliseconds and the dynamic surface tension of the ink at a lifetime of 500 milliseconds is 10 mN/m or more.

In addition, when plain paper or the like is used as a recording medium, in order to improve color uniformity, a dye in ink need be uniformly fixed to the recording medium. It should be noted that a state that the ink is uniformly fixed refers to not a state that the dye in the ink is taken in a relatively large void present in the plain paper or the like as a recording medium so as to localize but a state that fibers of which the recording medium is composed is uniformly dyed with the dye in the ink. In addition, in order for the dye in the ink to be uniformly fixed, the ink is required to exert wettability for pores such as voids between fibers. The inventors of the present invention have conducted investigation into physical properties needed for causing the ink to have wettability for the pore. As a result, the inventors have found that the dynamic surface tension of the ink at a lifetime of 500 milliseconds must be appropriately determined. To be specific, the inventors have found that the dynamic surface tension of the ink at a lifetime of 500 milliseconds must be 38 mN/m or less. That is, the inventors of the present invention have gained the knowledge that in order to simultaneously improve both of an improvement in color uniformity and an improvement in gradation, the ink is required to have the following dynamic surface tension characteristics. That is, an ink having the following characteristics is preferable: the dynamic surface tension of the ink at a lifetime of 50 milliseconds is 42 mN/m or more, the difference between the dynamic surface tension of the ink at a lifetime of 50 milliseconds and the dynamic surface tension of the ink at a lifetime of 500 milliseconds is 7 mN/m or more, and the dynamic surface tension of the ink at a lifetime of 500 milliseconds is 38 mN/m or less.

In the case where the dynamic surface tension of the ink at a lifetime of 50 milliseconds is 49 mN/m or more, even when the extent to which the dynamic surface tension of the ink is reduced after the lifetime is large, higher priority is placed on the spread of the ink on the surface of the recording medium than on the permeation of the ink in the thickness direction of the recording medium. As a result, the area of one dot increases, and gradation cannot be obtained in some cases. Accordingly, the dynamic surface tension of the ink at a lifetime of 50 milliseconds is preferably from 42 mN/m or more to less than 49 mN/m.

In addition, when the dynamic surface tension of the ink at a lifetime of 500 milliseconds is excessively low, specifically, less than 28 mN/m, higher priority is placed on the permeation of the ink into the recording medium than on the wetting of the voids between the fibers with the ink. As a result, the ink easily permeates into the recording medium (in the thickness direction of the recording medium), so a phenomenon in which the ink comes out of the back surface of the recording medium, that is, strike-through may occur. Accordingly, the dynamic surface tension of the ink at a lifetime of 500 milliseconds is preferably from 28 mN/m or more to 38 mN/m or less. Further, in the present invention, the dynamic surface tension of the ink at a lifetime of 500 milliseconds is particularly preferably from 32 mN/m or more to 38 mN/m or less.

In addition, the difference between the dynamic surface tension of the ink at a lifetime of 50 milliseconds and the dynamic surface tension of the ink at a lifetime of 500 milliseconds is preferably large from the viewpoint of the promotion of the permeation of the ink into the recording medium after a region where the ink permeates into the recording medium at a lifetime of 50 milliseconds has been determined to some extent. However, as described above, the dynamic surface tension of the ink at a lifetime of 500 milliseconds must be 28 mN/m or more. Accordingly, the difference between the dynamic surface tension of the ink at a lifetime of 50 milliseconds and the dynamic surface tension of the ink at a lifetime of 500 milliseconds is preferably equal to or lower than (the value of the dynamic surface tension of the ink at a lifetime of 50 milliseconds (mN/m)-28 (mN/m)). Further, the difference between the dynamic surface tension of the ink at a lifetime of 50 milliseconds and the dynamic surface tension of the ink at a lifetime of 500 milliseconds is more preferably less than 21 mN/m.

The foregoing shows that an ink capable of improving gradation while maintaining color uniformity when plain paper or the like is used as a recording medium (hereinafter referred to as "first ink") must satisfy the following conditions (1) to (3): (1) the first ink has a dynamic surface tension of from 42 mN/m or more to less than 49 mN/m at a lifetime of 50 milliseconds, (2) the first ink has a dynamic surface tension of from 28 mN/m or more to 38 mN/m or less at a lifetime of 500 milliseconds, and (3) the difference between the dynamic surface tension of the first ink at a lifetime of 50 milliseconds and the dynamic surface tension of the first ink at a lifetime of 500 milliseconds is 7 mN/m or more.

The summary of the foregoing description will be given below. An ink set according to the second embodiment of the present invention has the following constitution. That is, the ink set, which has a plurality of inks each containing a dye, has at least a first ink satisfying the conditions (1) to (3) described above. In addition, between the first ink and at least one type of ink except the first aqueous ink included in the ink set, an ink having relatively higher lightness is defined as an ink A, and an ink having relatively lower lightness is defined as an ink B. In this case, the dynamic surface tension $\gamma_a$ (mN/m) of the ink A at a lifetime of 500 milliseconds and the dynamic surface tension $\gamma_b$ (mN/m) of the ink B at a lifetime of 500 milliseconds must satisfy the relationship of $-5 \leq (\gamma_a - \gamma_b) \leq 3$.

Further, an ink set according to the third embodiment of the present invention has the following constitution. That is, the ink set, which has at least three types of inks each containing a dye, has at least a first ink satisfying the conditions (1) to (3) described above. In addition, among two types of inks arbitrarily selected from the at least three types of inks included in the ink set, an ink having relatively higher lightness is defined as an ink A, and an ink having relatively lower lightness is defined as an ink B. Further, the dynamic surface tension of the ink A at a lifetime of 500 milliseconds is represented by $\gamma_a$ (mN/m), and the dynamic surface tension of the ink B at a lifetime of 500 milliseconds is represented by $\gamma_b$ (mN/m). In this case, in each of all the combinations of two types of inks arbitrarily selected from the at least three types of the inks included in the ink set, the relationship of $-5 \leq (\gamma_a - \gamma_b) \leq 3$ must be valid.

In the ink set according to the third embodiment, in each of all the combinations of two types of inks arbitrarily selected from the at least three types of inks included in the ink set, the relationship of $-5 \leq (\gamma_a - \gamma_b) \leq 3$ must be valid. In this case, part of the combinations of two types of inks may be free of the first ink. In a combination free of the first ink, as in the case of a conventional ink set, the occurrence of bleeding can be suppressed by uniformizing the static surface tensions of the inks of the combination. However, in the present invention, even in a combination free of the first ink, the dynamic surface tensions of the inks of the combination at a lifetime of 500 milliseconds preferably satisfy the above relationship in order that the inks can be made identical to each other in permeability into a recording medium with improved accuracy.

The ink set of the present invention described above is characterized in that the ink set has a plurality of inks each containing a dye, and has at least the first ink described above.

The concept of the ink set in the present invention includes an ink set in the state of ink cartridges each independently containing one ink of a plurality of inks and an ink set in the state of an ink cartridge integrally formed by combining a plurality of ink storing portions containing respectively a plurality of inks. The ink cartridge may be formed integrally further with a recording head. Alternatively, a state that ink cartridges each independently containing one ink of a plurality of inks are so formed as to be detachable from an ink jet recording apparatus is also included in the concept of the ink set of the present invention. In any case, the ink set of the present invention has only to be formed so that at least the first ink and any other ink containing a dye can be used in combination, so the ink set is not limited to the above form, and may be in any form.

It should be noted that the ink set of the present invention may contain an ink containing a pigment in addition to the inks each containing a dye. In general, the ink containing a pigment is not used upon recording on a recording medium having an ink-receiving layer, so the ink may be free of any such dynamic surface tension characteristic as described above.

<Ink>

In the first embodiment of the present invention, the first ink must be adjusted so as to have any such dynamic surface tension characteristic as described above. In addition, in each of the second and third embodiments of the present invention, the first ink must be adjusted so as to have the dynamic surface tension characteristics (1) to (3) described above. Further, in the present invention, the ink A and the ink B determined from the a plurality of inks of which the ink set is composed as described above must be adjusted so as to have the dynamic surface tension characteristics described above. A constitution as in a conventional ink may be adopted except for the foregoing. Each of the components of which the ink of the present invention is composed will be described below.

(Surfactant)

Each of the inks of which the ink set of the present invention is composed preferably contains a surfactant as a penetrant. The prepared ink requires to be adjusted so as to have the above-described change in dynamic surface tension. The prepared ink requires to be adjusted so as to have the above-described change in dynamic surface tension.

(Nonionic Surfactant)

A polyoxyethylene alkyl ether, a polyoxyethylene fatty acid ester, a polyoxyethylene alkyl phenyl ether, a polyoxyethylene-polyoxypropylene block copolymer, and the like. A fatty acid diethanolamide, an ethylene oxide adduct of acetylene glycol, an acetylene glycol-based surfactant, and the like.

(Anionic Surfactant)

A polyoxyethylene alkyl ether sulfate, a polyoxyethylene alkyl ether sulfonate, a polyoxyethylene alkyl phenyl ether sulfate, a polyoxyethylene alkyl phenyl ether sulfonate, and the like. An α-sulfofatty acid ester salt, an alkylbenzene sulfonate, an alkyl phenol sulfonate, an alkyl naphthalene sulfonate, an alkyl tetralin sulfonate, a dialkyl sulfosuccinate, and the like.

(Cationic Surfactant)

An alkyl trimethylammonium salt, a dialkyl dimethylammonium chloride, and the like.

(Ampholytic Surfactant)

An alkyl carboxybetaine and the like.

(Other Surfactant)

A fluorine-based compound, a silicone-based compound, and the like.

In the first embodiment of the present invention, the first ink must be adjusted so as to have such dynamic surface tension characteristic as described above. In addition, in each of the second and third embodiments of the present invention, the first ink must be adjusted so as to have the dynamic surface tension characteristics (1) to (3) described above. The first ink can achieve each of the dynamic surface tension characteristics described above by adjusting the dynamic surface tension of the ink with one or two or more types of surfactants listed above.

In the present invention, the dynamic surface tension of the first ink is adjusted particularly preferably with a polyoxyethylene alkyl ether or an ethylene oxide adduct of acetylene glycol among the above surfactants.

In addition, in the present invention, the polyoxyethylene alkyl ether is particularly preferably at least one selected from surfactants each represented by the following general formula (1) and surfactants each represented by the following general formula (2). An ink containing such a surfactant is particularly suitable for achieving the compatibility between gradation and color uniformity when plain paper or the like is used as a recording medium because its dynamic surface tension changes to a large extent as a lifetime changes.

General formula (1)

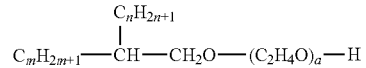

(In the general formula (1), m, n, and a each independently represent an integer of 1 or more, and m+n represents an integer of from 14 to 20.)

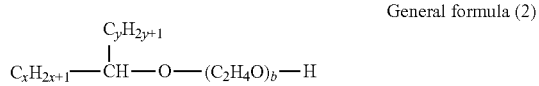

General formula (2)

(In the general formula (2), x, y, and b each independently represent an integer of 1 or more, and x+y represents an integer of from 15 to 21.)

Further, in the present invention, the HLB value of the above surfactant according to Griffin method is particularly preferably from 12.0 or more to 16.5 or less. The term "Griffin method" as used herein refers to a method of calculating a HLB value by using the following equation (1) on the basis of the formula weight of a hydrophilic group of a surfactant and the molecular weight of the surfactant.

$$HLB = 20 \times (\text{formula weight of hydrophilic group of surfactant})/(\text{molecular weight of surfactant}) \quad (1)$$

When the HLB is less than 12.0, the hydrophilicity of the surfactant is so low that, for example, when the ink is contained, a state that the surfactant is dissolved in the ink cannot be maintained in some cases. On the other hand, when the HLB is more than 16.5, the hydrophilicity of the surfactant is so high that it is difficult to reduce the dynamic surface tension of the ink at a lifetime of 500 milliseconds.

The content (% by mass) of the surfactant in the first ink is preferably from 0.30% by mass or more to 2.0% by mass or less, or more preferably from 0.30% by mass or more to 1.5% by mass or less with respect to the total mass of the ink. When the content is less than 0.30% by mass, a member from which an ink flow path of an ink jet recording apparatus is formed is not sufficiently wet with the ink, and the discharge stability of the ink is lowered in some cases. In addition, when the content exceeds 2.0% by mass, in the case where, for example, moisture in the ink evaporates near a discharge orifice of a recording head, the content of the surfactant becomes so high that the viscosity of the ink increases locally, and the discharge stability of the ink may be reduced. Further, in order that excellent image quality can be obtained when plain paper or the like is used as a recording medium, the lower limit of the content (% by mass) of the surfactant in the first ink is preferably 0.30% by mass or more, or more preferably 0.75% by mass or more with respect to the total mass of the ink. When the content is less than 0.30% by mass, the ink wettability of the plain paper cannot be sufficiently obtained, and color uniformity is reduced in some cases. Setting the content of the surfactant in the ink within the above range enables the ink to achieve the compatibility between excellent discharge stability and excellent image quality when plain paper or the like is used as a recording medium, in particular, excellent color uniformity.

In addition, the content (% by mass) of a surfactant in any ink except the first ink included in the ink set is formed is preferably from 0.10% by mass or more to 2.0% by mass or less, or more preferably from 0.30% by mass or more to 1.5% by mass or less, with respect to the total mass of the ink. The preferable range of the content is, of course, not limited to the above range because the preferable range varies depending on the structure or HLB value of the surfactant.

Further, in the present invention, the ink A and the ink B determined as described above must be adjusted so as to have the dynamic surface tension characteristics at a lifetime of 500 milliseconds described above. The ink A and the ink B can achieve the dynamic surface tension characteristics described above by adjusting the dynamic surface tension of each of the inks with one or two or more types of surfactants listed above. As in the case of the foregoing, the content (% by mass) of a surfactant in each of the ink A and the ink B is preferably from 0.10% by mass or more to 2.0% by mass or less, or more preferably from 0.30% by mass or more to 1.5% by mass or less, with respect to the total mass of the ink from the viewpoint of ejection stability.

(Aqueous Medium)

Each ink included in the ink set of the present invention preferably contains an aqueous medium as a mixed solvent of water and a water-soluble organic compound. Deionized water (ion-exchange water) is preferably used as water. The content (% by mass) of water in the ink is preferably from 30.0% by mass or more to 90.0% by mass or less with respect to the total mass of the ink in order that the ink can have suitable viscosity so as to be stably ejected, and clogging at the tip of a nozzle with the ink may be suppressed.

In addition, any water-soluble organic compound can be used as the water-soluble organic compound as long as the ink of the present invention is adjusted so as to have such dynamic surface tension characteristics as described above. The content (% by mass) of the water-soluble organic solvent in the ink is preferably from 1.0% by mass or more to 50.0% by mass or less, and more preferably, from 3.0% by mass or more to 40.0% by mass or less, with respect to the total mass of the ink. To be specific, for example, any one of the following can be used as the water-soluble organic compound.

Alcohols having 1 to 6 carbon atoms, such as ethanol, isopropanol, 2-propanol, n-butanol, isobunanol, pentanol, and hexanol; carboxylic amides such as N,N-dimethylformamide and N,N-dimethylacetamide; ketones or ketoalcohols such as acetone, methylethylketone, and 2-methyl-2-hydroxypentane-4-one; cyclic ethers such as tetrahydrofuran and dioxane; alkylene glycols such as ethylene glycol, diethylene glycol, triethylene glycol, tetraethylene glycol, 1,2- or 1,3-propylene glycol, 1,2- or 1,4-butylene glycol, and polyethylene glycol; polyalcohols such as glycerin, 1,3-butanediol, 1,2- or 1,5-pentanediol, 1,2- or 1,6-hexanediol, 2-methyl-1,3-propanediol, and 1,2,6-hexanetriol; alkyl ethers of the polyalcohols such as ethylene glycol monomethyl (or ethyl)ether, diethylene glycol monomethyl (or ethyl) ether, and triethylene glycol monoethyl (or butyl) ether; heterocycles such as 2-pyrrolidone, N-methyl-2-pyrrolidone, 1,3-dimethyl-2-imidazolidinone, and N-methyl morpholine; and a sulfur-containing compound such as dimethyl sulfoxide and thiodiglycol.

Of those, a water-soluble organic compound having high permeability is particularly preferably used in order that the surface tension of the aqueous medium can be appropriately adjusted. To be specific, any one of the alcohols such as ethanol, 2-propanol, 1,2-pentanediol, 1,5-pentanediol, 1,2-hexanediol, and 1,6-hexanediol is particularly preferably used.

In the first embodiment of the present invention, the first ink must be adjusted so as to have such dynamic surface tension characteristics as described above. In addition, in each of the second and third embodiments of the present invention, the first ink must be adjusted so as to have the dynamic surface tension characteristics (1) to (3) described above. The first ink can be allowed to have such dynamic surface tension characteristics as described above also by adjusting the dynamic surface tension of the ink with one or two or more types of water-soluble organic compounds listed above. Further, in order that particularly excellent gradation can be obtained when plain paper or the like is used as a recording medium, the static surface tension of the aqueous medium in the first ink is preferably from 45 mN/m or more to 57 mN/m or less. The term "aqueous medium in ink" as used in the present invention refers to an aqueous medium excluding the coloring material and surfactant in the ink, that is, water and the water-soluble organic compound. When the static surface tension of the aqueous medium is higher than 57 mN/m, or is lower than 45 mN/m, in the case where plain paper having relatively large surface energy unevenness among various types of plain papers is used as a recording medium, gradation cannot be sufficiently obtained in some cases. When the static surface tension of the aqueous medium is higher than 57 mN/m, between a portion with high surface energy and a portion with low surface energy present near a portion where the ink is applied in the recording medium, the ink is apt to flow selectively into the portion with high surface energy. As a result, feathering is apt to occur, and the variation in area between dots becomes large, so gradation cannot be sufficiently obtained in some cases. On the other hand, when the static surface tension of the aqueous medium is lower than 45 mN/m, the surface tension of the aqueous medium in the ink is lower than that near the portion where the ink is applied in the recording medium, so the ink rapidly spreads, and, as a result, gradation is lowered in some cases.

In addition, in the present invention, the ink A and the ink B determined as described above from the a plurality of inks included in the ink set must be adjusted so as to have the dynamic surface tension characteristics at a lifetime of 500 milliseconds described above. The ink A and the ink B can achieve the dynamic surface tension characteristics described above also by adjusting the dynamic surface tension of each of the inks with one or two or more types of water-soluble organic compounds listed above.

(Coloring Material)

The coloring material to be used in each ink included in the ink set of the present invention is a dye. The content (% by mass) of the dye in the ink is preferably from 0.1% by mass or more to 15.0% by mass or less, or more preferably from 1.0% by mass or more to 10.0% by mass or less, with respect to the total mass of the ink.

The dye is not particularly limited as long as the dye can be used as a coloring material for a general ink jet ink, and, for example, any one of a direct dye, an acid dye, a reactive dye, and a basic dye can be used. Examples of the dye usable in the present invention are indicated below for each color tone by the use of color index numbers. In addition, even dyes not described in any color index can be used as long as they are water-soluble.

(Yellow Coloring Material)

C.I. Direct Yellow: 8, 11, 12, 27, 28, 33, 39, 44, 50, 58, 85, 86, 87, 88, 89, 98, 100, 110, 132, 173, and the like. C.I. Acid Yellow: 1, 3, 7, 11, 17, 23, 25, 29, 36, 38, 40, 42, 44, 76, 98, 99, and the like.

(Magenta Coloring Material)

C.I. Direct Red: 2, 4, 9, 11, 20, 23, 24, 31, 39, 46, 62, 75, 79, 80, 83, 89, 95, 197, 201, 218, 220, 224, 225, 226, 227, 228, 229, 230, and the like. C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289, and the like. C.I. Food Red: 87, 92, 94, and the like. C.I. Direct Violet: 107 and the like.

(Cyan Coloring Material)

C.I. Direct Blue: 1, 15, 22, 25, 41, 76, 77, 80, 86, 90, 98, 106, 108, 120, 158, 163, 168, 199, 226, 307, and the like. C.I. Acid Blue: 1, 7, 9, 15, 22, 23, 25, 29, 40, 43, 59, 62, 74, 78, 80, 90, 100, 102, 104, 112, 117, 127, 138, 158, 161, 203, 204, 221, 244, and the like.

(Orange Coloring Material)

C.I. Acid Orange: 7, 8, 10, 12, 24, 33, 56, 67, 74, 88, 94, 116, 142, and the like. C.I. Acid Red: 111, 114, 266, 374, and the like. C.I. Direct Orange: 26, 29, 34, 39, 57, 102, 118, and the like. C.I. Food Orange: 3 and the like. C.I. Reactive Orange: 1, 4, 5, 7, 12, 13, 14, 15, 16, 20, 29, 30, 84, 107, and the like. C.I. Disperse Orange: 1, 3, 11, 13, 20, 25, 29, 30, 31, 32, 47, 55, 56, and the like.

(Green Coloring Material)

C.I. Acid Green: 1, 3, 5, 6, 9, 12, 15, 16, 19, 21, 25, 28, 81, 84, and the like. C.I. Direct Green: 26, 59, 67, and the like. C.I. Food Green: 3 and the like. C.I. Reactive Green: 5, 6, 12, 19, 21, and the like. C.I. Disperse Green: 6, 9, and the like.

(Blue Coloring Material)

C.I. Acid Blue: 62, 80, 83, 90, 104, 112, 113, 142, 203, 204, 221, 244, and the like. C.I. Reactive Blue: 49 and the like. C.I. Acid Violet: 17, 19, 48, 49, 54, 129, and the like. C.I. Direct Violet: 9, 35, 47, 51, 66, 93, 95, 99, and the like. C.I. Reactive Violet: 1, 2, 4, 5, 6, 8, 9, 22, 34, 36, and the like. C.I. Disperse Violet: 1, 4, 8, 23, 26, 28, 31, 33, 35, 38, 48, 56, and the like.

(Black Coloring Material)

C.I. Direct Black: 17, 19, 22, 31, 32, 51, 62, 71, 74, 112, 113, 154, 168, 195, and the like. C.I. Acid Black: 2, 48, 51, 52, 110, 115, 156, and the like. C.I. Food Black: 1, 2, and the like.

(Brown Coloring Material)

C.I. Reactive brown: 1, 2, 7, 8, 9, 11, 17, 18, 21, 31, 32, 33, 46, 47, and the like.

(Other Components)

Each ink included in the ink set of the present invention may contain an organic compound which is a solid at ordinary temperature, such as trimethylolethane or trimethylolpropane, or a nitrogen-containing compound such as urea or ethylene urea in addition to such components as described above as required. Further, the ink of the present invention may contain any one of the various additives such as a pH adjustor, a rust inhibitor, an antiseptic, a mildewproofing agent, an antioxidant, an antireducing agent, an evaporation accelerator, and a chelating agent in addition to such components as described above in order that the ink may have desired physical property values.

(Ink Jet Recording Method)

The ink of the present invention is particularly suitably used for an ink jet recording method in which recording is performed on a recording medium by ejecting the ink by an ink jet recording system. Examples of the ink jet recording method include a method involving applying mechanical energy to ink to eject the ink and a method involving applying thermal energy to ink to eject the ink. Particularly, the ink of the present invention can exhibit outstanding meritorious effects when being used in the ink jet recording method involving the use of thermal energy.

(Ink Cartridge)

An ink cartridge of the present invention is characterized by including an ink storing portion for storing the ink of the present invention.

(Recording Unit)

A recording unit of the present invention is characterized by including: an ink storing portion for storing the ink of the present invention; and a recording head for ejecting the ink. A significant effect can be obtained particularly when the recording unit is such that the recording head ejects the ink by applying thermal energy to the ink.

(Ink Jet Recording Apparatus)

An ink jet recording apparatus of the present invention is characterized by including: an ink storing portion for storing the ink of the present invention; and a recording head for ejecting the ink. A significant effect can be obtained particularly when the ink jet recording apparatus is such that the recording head ejects the ink by applying thermal energy to the ink.

Hereinafter, the constitution of a mechanism portion of an ink jet recording apparatus will be outlined. An ink jet recording apparatus is constituted of a sheet feeding portion, a conveying portion, a carriage portion, a sheet delivery portion, a cleaning portion, and an external packaging portion for protecting them and providing the apparatus with a design to achieve a role of each mechanism. Hereinafter, the outline of each of them will be described.

Figure 2:
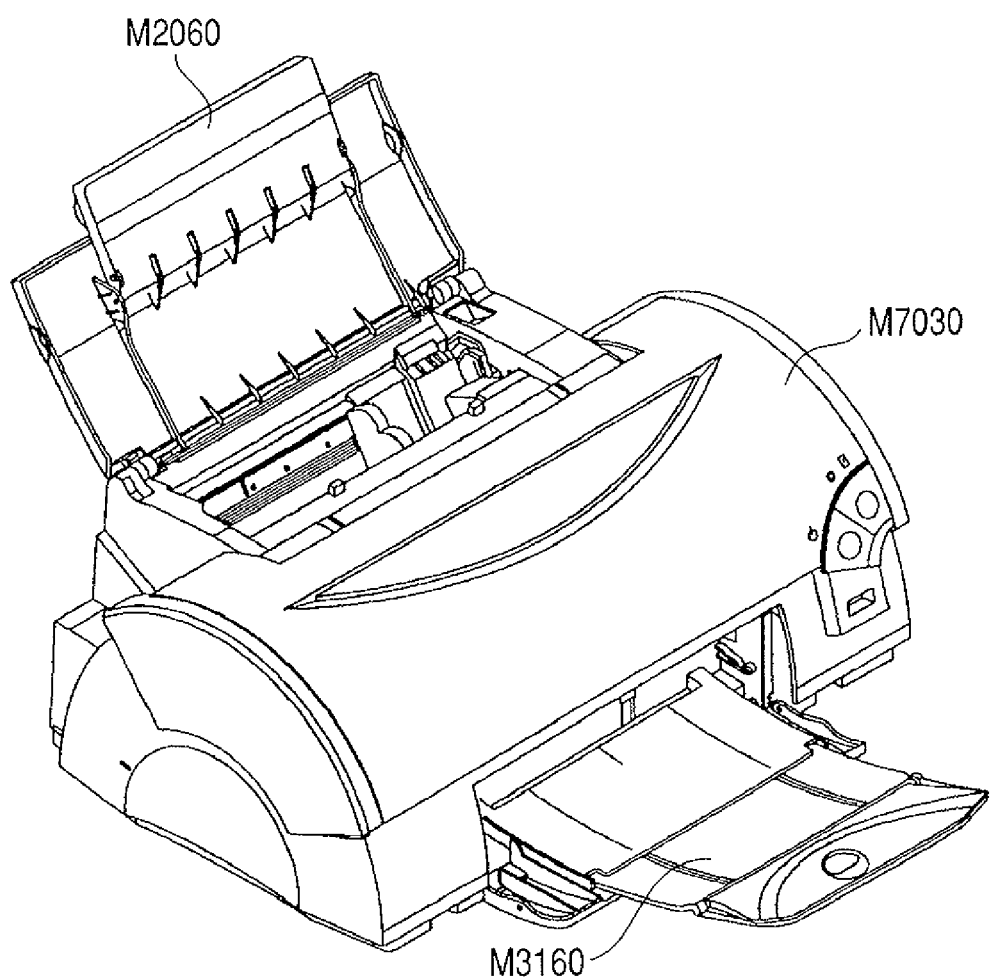
FIG. 2 is a perspective view of an ink jet recording apparatus.
Figure 3:
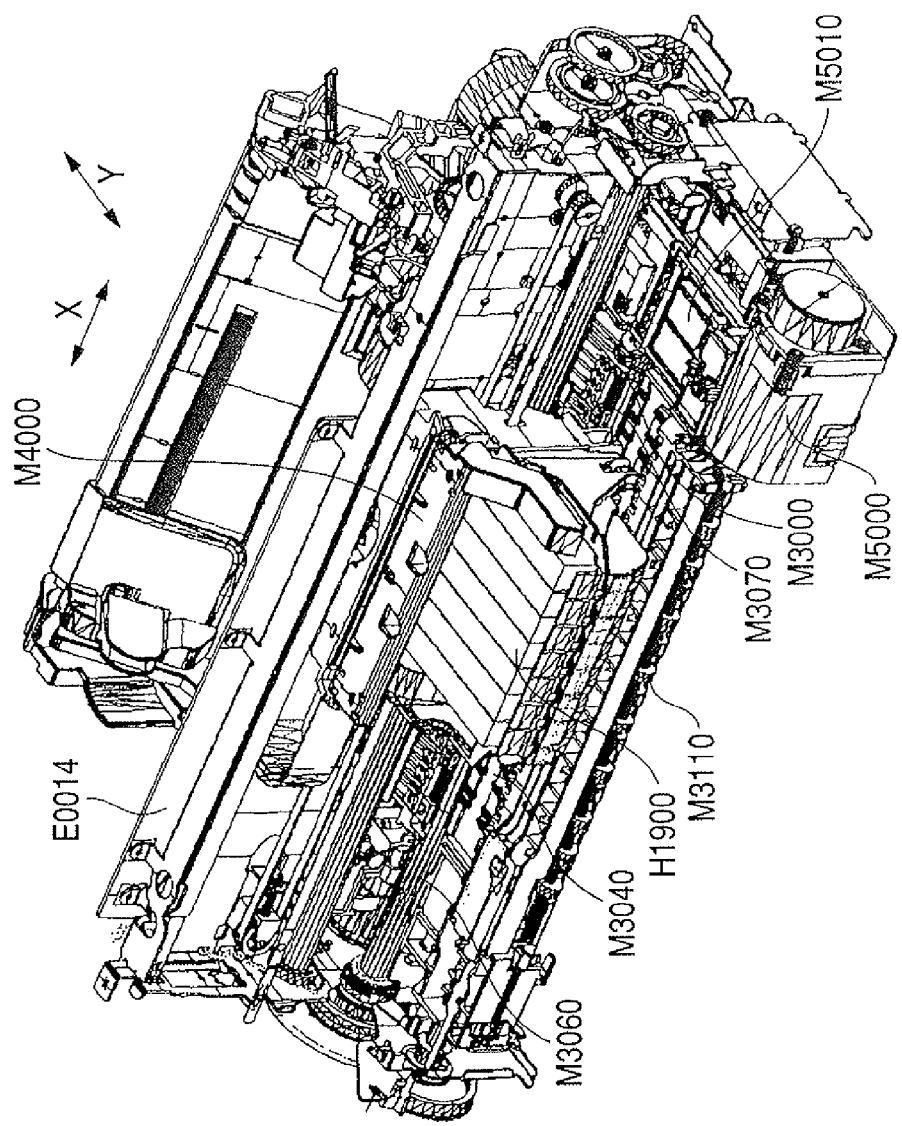
FIG. 3 is a perspective view of the mechanism portion of the ink jet recording apparatus.
Figure 4:
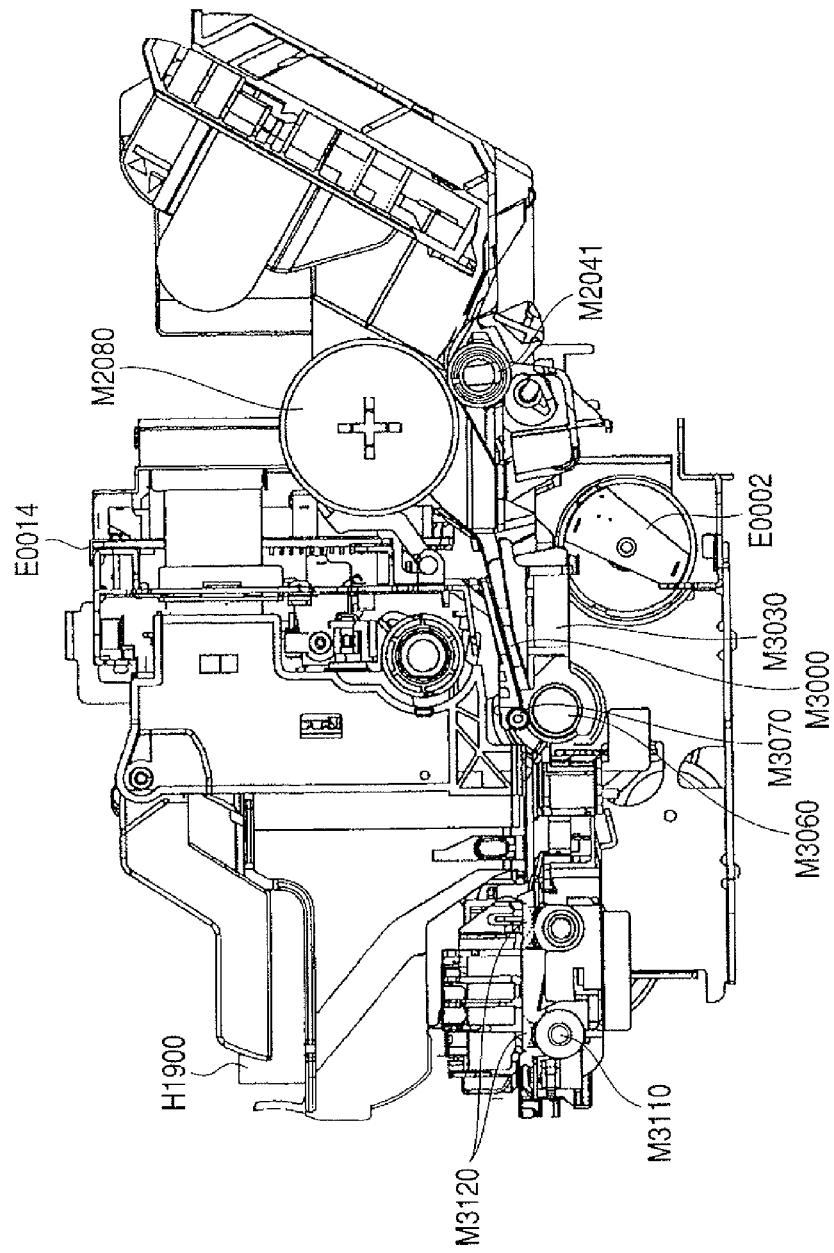
FIG. 4 is a sectional view of the ink jet recording apparatus.

FIG. 2 is a perspective view of an ink jet recording apparatus. FIGS. 3 and 4 are views for illustrating the internal mechanism of an ink jet recording apparatus. FIG. 3 is a perspective view seen from an upper right portion, and FIG. 4 is a side sectional view of the ink jet recording apparatus.

When a sheet is to be fed in the recording apparatus, only the predetermined number of recording media is sent to a nip portion composed of a sheet feeding roller M2080 and a separating roller M2041 in the sheet feeding portion including a sheet feeding tray M2060 (see FIGS. 2 and 4). The sent recording media are separated at the nip portion, and only the uppermost recording medium is conveyed. The recording medium sent to the sheet conveying portion is guided by a pinch roller holder M3000 and a paper guide flapper M3030 to be sent to a roller pair composed of a conveying roller M3060 and a pinch roller M3070. The roller pair composed of the conveying roller M3060 and the pinch roller M3070 are rotated by an LF motor E0002, and the rotation causes the recording medium to be conveyed on a platen M3040 (see FIGS. 3 and 4).

Upon formation of an image, a carriage portion places a recording head H1001 (see FIG. 5) at a position where a target image is formed, and ink is ejected onto a recording medium in accordance with a signal from an electric substrate E0014 (see FIG. 3). The detailed constitution of the recording head H1001 will be described later. While recording is performed with the recording head H1001, an image is formed on the recording medium by alternately repeating primary scanning in which a carriage M4000 (see FIG. 3) scans the recording medium in a column direction and secondary scanning in which the transport roller M3060 (see FIGS. 3 and 4) transports the recording medium in a row direction.

Finally, the recording medium is fastened at a nip between a first delivery roller M3110 and a spur M3120 in a delivery portion (see FIG. 4), and is transported so as to be discharged to a delivery tray M3160 (see FIG. 2).

A cleaning portion cleans the recording head H1001. The cleaning portion sucks the ink or the like from the recording head H1001 by activating a pump M5000 (see FIG. 3) in a state that a cap M5010 (see FIG. 3) is brought into close contact with a ejection orifice of the recording head H1001. In addition, when the cleaning portion sucks the ink remaining in the cap M5010 in a state that the cap M5010 is opened, the fixing of the ink or any other detrimental effects are prevented from occurring.

(Constitution of Recording Head)

The constitution of a head cartridge H1000 will be described (see FIG. 5). The head cartridge H1000 includes the recording head H1001, a means for mounting ink cartridge H1900, and a means for supplying ink from the ink cartridge H1900 to the recording head. The head cartridge H1000 is detachably mounted on the carriage M4000 (see FIG. 3).

Figure 5:
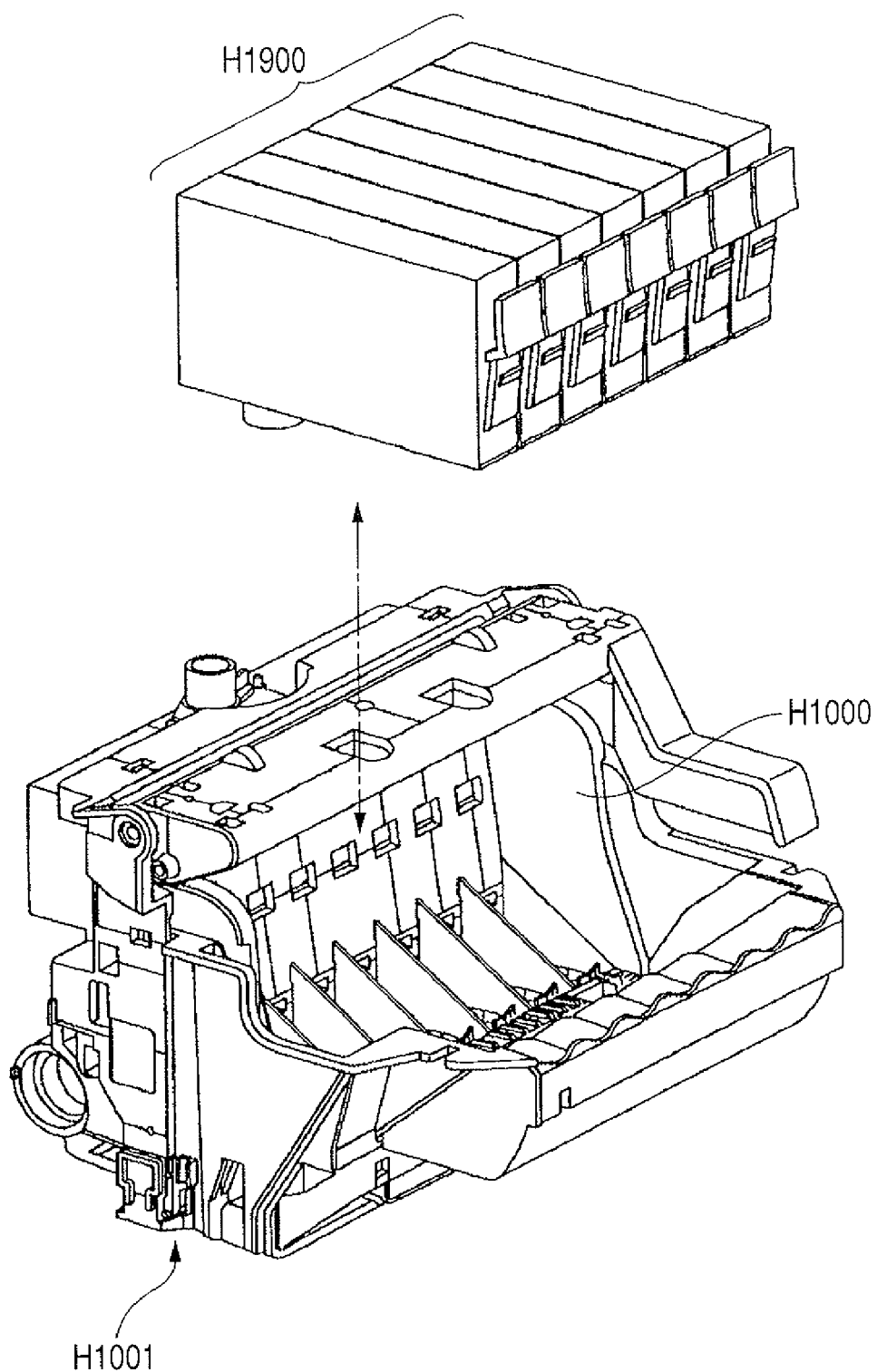
FIG. 5 is a perspective view illustrating a state in which an ink cartridge is mounted on a head cartridge.

FIG. 5 shows how the ink cartridges H1900 are mounted on the head cartridge H1000. The ink jet recording apparatus forms an image by means of, for example, each of yellow, magenta, cyan, black, light magenta, light cyan, and green inks, so the ink cartridges H1900 is independently prepared for each of the seven colors. In addition, as shown in FIG. 5, each ink cartridge H1900 is detachable from the head cartridge H1000. The ink cartridge H1900 can be detached in a state that the head cartridge H1000 is mounted on the carriage M4000 (see FIG. 3).

Figure 6:
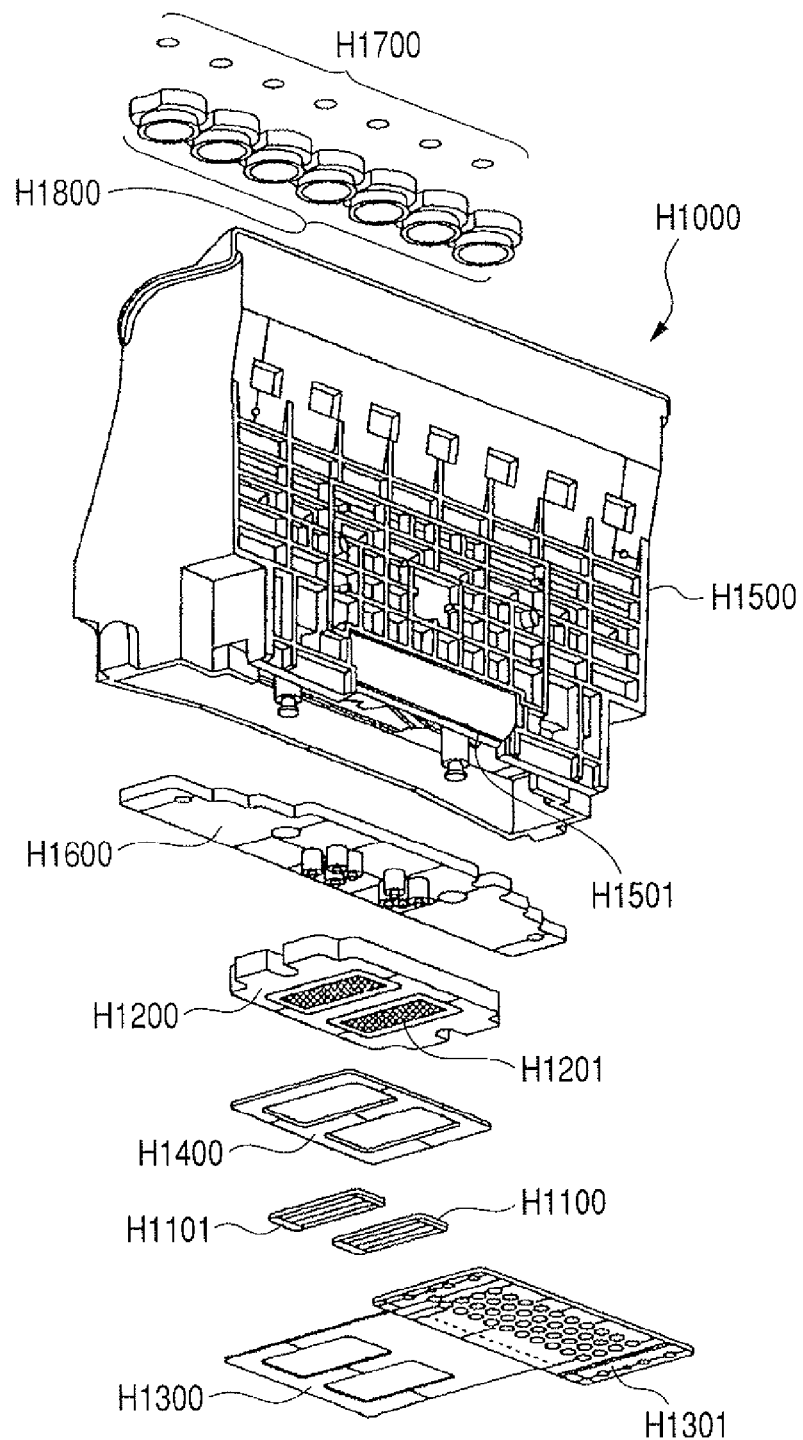
FIG. 6 is an exploded perspective view of the head cartridge.

FIG. 6 shows an exploded perspective view of the head cartridge H1000. The head cartridge H1000 is constituted of a recording element substrate, a plate, an electric wiring substrate H1300, a cartridge holder H1500, a flow path forming member H1600, a filter H1700, and a seal rubber H1800. The recording element substrate is composed of a first recording element substrate H1100 and a second recording element substrate H1101, and the plate is composed of a first plate H1200 and a second plate H1400.

Each of the first recording element substrate H1100 and the second recording element substrate H1101 is an Si substrate having a plurality of recording elements (nozzles) for ejecting ink which are formed on one side thereof by means of photolithography. Electric wiring formed of Al or the like for supplying power to each recording element is formed by means of a film formation technology or the like, and a plurality of ink flow paths corresponding respectively to the recording elements are also formed by means of photolithography. Further, ink supply orifices for supplying ink to the plurality of ink flow paths are formed so as to open on the rear surface.

Figure 7:
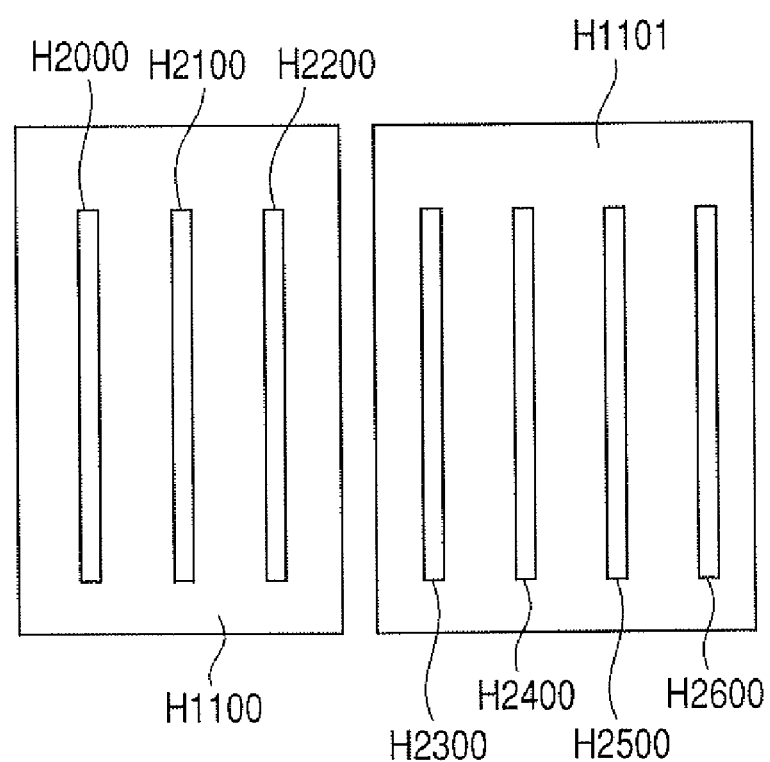
FIG. 7 is a front view illustrating recording element substrates in the head cartridge.

FIG. 7 is an enlarged front view for illustrating the constitution of each of the first recording element substrate H1100 and the second recording element substrate H1101. Reference characters H2000 to H2600 denote recording element trains (hereinafter referred to also as nozzle trains) each supplying a different ink color. The first recording element substrate H1100 has nozzle trains for three colors: the nozzle train H2000 for yellow ink; the nozzle train H2100 for magenta ink; and the nozzle train H2200 for cyan ink. The second recording element substrate H1101 has nozzle trains for four colors: the nozzle train H2300 for light cyan ink; the nozzle train H2400 for black ink; the nozzle train H2500 for green ink; and the nozzle train H2600 for light magenta ink.

Each nozzle train includes 768 nozzles arranged at intervals of 1,200 dpi (dot/inch; reference value) in the direction in which a recording medium is conveyed, and each nozzle ejects about 2 pl of ink. An opening area in each ejection orifice is set to be about 100 μm$^2$.

Hereinafter, description will be given with reference to FIGS. 5 and 6. The first recording element substrate H1100 and the second recording element substrate H1101 are bonded and fixed to the first plate H1200, and ink supply orifices H1201 for supplying ink to the first recording element substrate H1100 and the second recording element substrate H1101 are formed on the first plate H1200. The second plate H1400 having openings is also bonded and fixed to the first plate H1200. The second plate H1400 holds the electric wiring substrate H1300 in such a manner that the electric wiring substrate H1300, the first recording element substrate H1100, and the second recording element substrate H1101 are electrically connected.

The electric wiring substrate H1300 applies an electrical signal for causing each of the nozzles formed on the first recording element substrate H1100 and the second recording element substrate H1101 to eject ink. The electric wiring substrate H1300 has: electric wiring corresponding to each of the first recording element substrate H1100 and the second recording element substrate H1101; and an external signal input terminal H1301 which is positioned at an end portion of the electric wiring to receive an electrical signal from the ink jet recording apparatus. The external signal input terminal H1301 is positioned and fixed to the back surface side of the cartridge holder H1500.

The flow path forming member H1600 is fixed by means of, for example, ultrasonic welding to the cartridge holder H1500 for holding the ink cartridge H1900. Thus, an ink flow path H1501 passing from the ink cartridge H1900 to the first plate H1200 is formed. The filter H1700 is provided at an end portion on the ink cartridge side of the ink flow path H1501 engaged with the ink cartridge H1900, so the filter H1700 prevents dust from entering from the outside. The seal rubber H1800 is mounted on the portion at which the ink flow path H1501 is engaged with the ink cartridge H1900 to prevent ink from evaporating from the portion.

Further, the head cartridge H1000 is formed by, for example, causing a cartridge holder portion and the recording head H1001 to adhere to each other. The cartridge holder portion is composed of the cartridge holder H1500, the flow path forming member H1600, the filter H1700, and the sealing rubber H1800. In addition, the recording head H1001 is composed of the first recording element substrate H1100 and the second recording element substrate H1101, the first plate H1200, the electric wiring substrate H1300, and the second plate H1400.

Description has been given here by taking, as an example of an embodiment of a recording head, a recording head according to a thermal ink jet system that performs recording by means of an electrothermal transducer (recording element) for generating thermal energy for causing ink to generate film boiling in accordance with an electrical signal. As for the representative constitution and principle, it is preferable to use basic principles discussed in, for example, U.S. Pat. No. 4,723,129 and U.S. Pat. No. 4,740,796. The system is applicable to any one of the so-called on-demand type and the so-called continuous type.

The thermal ink jet system is particularly applicable to the on-demand type. In the case of the on-demand type, at least one driving signal which corresponds to recording information and triggers a rapid temperature rise exceeding nucleate boiling is applied to electrothermal transducers arranged corresponding to liquid paths holding ink, to thereby cause the electrothermal transducer to generate thermal energy. Then, the ink is caused to generate film boiling. As a result, an air bubble in the ink can be formed so as to be in one-to-one correspondence with the driving signal. The growth and contraction of the air bubble cause the ink to be ejected through an opening for ejection, thereby forming at least one droplet. The driving signal is more preferably of a pulse shape because the growth and contraction of an air bubble can be performed immediately and appropriately, and hence ink can be discharged with excellent responsiveness.

The ink of the present invention can be preferably used not only in a recording head according to the thermal ink jet system but also in such an ink jet recording apparatus utilizing mechanical energy as described below. The ink jet recording apparatus in such a form includes: a nozzle-forming substrate having a plurality of nozzles; a pressure-generating element placed opposite to the nozzles and composed of a piezoelectric material and a conductive material; and ink with which the periphery of the pressure-generating element is filled. In addition, the pressure-generating element is displaced by an applied voltage to eject the ink from the nozzles.

The ink jet recording apparatus is not limited to such apparatuses as described above in which a recording head and an ink cartridge are separated, and may be one in which a head and an ink cartridge are so integrated as to be inseparable. Further, the ink cartridge may be separably or inseparably unified with the recording head to be mounted on a carriage, or may be mounted on a fixing portion of an ink jet recording apparatus to supply ink to a recording head through an ink supply member such as a tube. When the ink cartridge is provided with a constitution for applying a preferable negative pressure to the recording head, it may be configured as follows. That is, an absorber may be placed in an ink storing portion of the ink cartridge, or the ink cartridge may have a flexible ink storage bag and a spring portion for exerting biasing power in the direction of expanding the internal volume of the bag. Further, the ink jet recording apparatus may adopt a serial recording system, or may be in the form of a line printer in which recording elements are aligned over the range corresponding to the entire width of a recording medium.

EXAMPLES

Hereinafter, the present invention is described in more detail by way of examples and comparative examples. However, the present invention is not limited to the following examples as long as not departing from the gist of the present invention. Unless otherwise stated, the terms "part(s)" and "%" are by mass.

<HLB Value and Structure of Surfactant>

The HLB values of surfactants were determined. Specifically, the HLB value of the main component in the respective surfactants was calculated according to the Griffin method (the following equation (1)). The results are shown in Table 1.

$$HLB = 20 \times (\text{formula weight of hydrophilic group of surfactant})/(\text{molecular weight of surfactant}) \quad (1)$$

In addition, Table 1 collectively shows the structure of the main component of each surfactant, and, when the structure of the surfactant corresponded to the general formula (1) or the general formula (2), values of m, n, a, and m+n, or values of x, y, b, and x+y. In Table 1, EMALEX 1615 is a surfactant manufactured by NIHON EMULSION Co., Ltd., and Acetylenol E100 is a surfactant manufactured by Kawaken Fine Chemicals Co., Ltd. In addition, EMULMIN CO-50 and EMULMIN NL90 are each a surfactant manufactured by Sanyo Chemical Industries Ltd., and NIKKOL BT-7 is a surfactant manufactured by Nikko Chemicals co., ltd.

TABLE 1

| | HLB value | Structure of surfactant | General formula (1) | | | | General formula (2) | | | |
|---|---|---|---|---|---|---|---|---|---|---|
| | | | m | n | a | m + a | x | y | b | x + y |
| EMALEX 1615 | 14.7 | Polyoxyethylene isocetyl ether | 8 | 6 | 15 | 14 | — | — | — | — |
| Acetylenol E100 | 13.3 | Acetylene glycol ethylene oxide adduct | — | — | — | — | — | — | — | — |
| EMULMIN CO-50 | 9.0 | Polyoxyethylene oleyl ether | — | — | — | — | — | — | — | — |

TABLE 1-continued

| | HLB value | Structure of surfactant | General formula (1) | | | | General formula (2) | | | |
|---|---|---|---|---|---|---|---|---|---|---|
| | | | m | n | a | m + a | x | y | b | x + y |
| EMULMIN NL90 | 13.6 | Polyoxyethylene lauryl ether | — | — | — | — | — | — | — | — |
| NIKKOL BT-7 | 12.2 | Polyoxyethylene sec-tridecyl ether | — | — | — | — | 6 | 6 | 7 | 12 |

<Preparation of Inks>

The respective components shown in each of Tables 2 to 4 were mixed, and the mixture was thoroughly stirred. After that, the resultant was filtered through a microfilter having a pore size of 0.2 μm (manufactured by Pall Corporation) under pressure, whereby each of cyan inks (C1 to C5), magenta inks (M1 to M8), and yellow inks (Y1 to Y3) was prepared. In Tables 2 to 4, EMALEX 1615 is a surfactant manufactured by NIHON EMULSION Co., Ltd., and Acetylenol E100 is a surfactant manufactured by Kawaken Fine Chemicals Co., Ltd. In addition, EMULMIN CO-50 and EMULMIN NL90 are each a surfactant manufactured by Sanyo Chemical Industries Ltd., and NIKKOL BT-7 is a surfactant manufactured by Nikko Chemicals co., ltd.

TABLE 2

(Unit: %)

| | Cyan ink | | | | |
|---|---|---|---|---|---|
| | C1 | C2 | C3 | C4 | C5 |
| C.I. Direct Blue 199 | 6.00 | 6.00 | 6.00 | 6.00 | 6.00 |
| Glycerin | 10.00 | 10.00 | 5.00 | 10.00 | 10.00 |
| Diethylene glycol | 5.00 | 5.00 | 5.00 | 7.00 | 7.00 |
| 2-pyrrolidone | 5.00 | 5.00 | | | |
| 1,5-pentanediol | | | 10.00 | 3.00 | 3.00 |
| 1,2-hexanediol | | 0.75 | 0.50 | | |
| EMALEX 1615 | 0.75 | 1.20 | | | |
| EMULMIN CO-50 | | | 2.10 | | |
| EMULMIN NL90 | | | | 0.20 | |
| NIKKOL BT-7 | | | | | 0.20 |
| Pure water | 73.25 | 72.05 | 71.40 | 73.80 | 73.80 |

TABLE 3

(Unit: %)

| | Magenta ink | | | | | | | |
|---|---|---|---|---|---|---|---|---|
| | M1 | M2 | M3 | M4 | M5 | M6 | M7 | M8 |
| C.I. Acid Red 289 | 3.00 | 3.00 | 3.00 | 3.00 | 3.00 | 3.00 | 3.00 | 3.00 |
| Glycerin | 10.00 | 10.00 | 10.00 | 10.00 | 10.00 | 10.00 | 10.00 | 10.00 |
| Diethylene glycol | 5.00 | 5.00 | 5.00 | 5.00 | 5.00 | 5.00 | 5.00 | 5.00 |
| 2-pyrrolidone | 5.00 | 5.00 | 5.00 | 5.00 | 5.00 | 5.00 | 5.00 | 5.00 |
| 1,2-hexanediol | | | 5.00 | | | | | |
| Acetylenol E100 | 0.30 | | | 1.20 | 0.80 | 0.50 | 0.18 | 0.15 |
| EMALEX1615 | | 0.75 | | | | | | |
| Pure water | 76.70 | 76.25 | 72.00 | 75.80 | 76.20 | 76.50 | 76.82 | 76.85 |

TABLE 4

(Unit: %)

| | Yellow ink | | |
|---|---|---|---|
| | Y1 | Y2 | Y3 |
| C.I. Acid Yellow 23 | 3.00 | 3.00 | 3.00 |
| Glycerin | 10.00 | 10.00 | 10.00 |
| Diethylene glycol | 5.00 | 5.00 | 5.00 |
| 2-pyrrolidone | 5.00 | 5.00 | 5.00 |
| Acetylenol E100 | | 0.30 | 0.60 |
| EMALEX 1615 | 0.75 | | |
| Pure water | 76.25 | 76.70 | 76.40 |

<Evaluation>

(Measurement of Dynamic Surface Tension)

The (1) dynamic surface tension of each of the inks obtained above at a lifetime of 50 milliseconds, and the (2) dynamic surface tension of each of the inks at a lifetime of 500 milliseconds were measured. In addition, the difference $\Delta\gamma[(1)-(2)]$ between the dynamic surface tensions (1) and (2) was determined. An apparatus for measuring a dynamic surface tension by a maximum bubble pressure method (Bubble Pressure Tensiometer BP2; manufactured by KRUSS) was used in the measurement. In addition, the dynamic surface tensions were each measured at 25° C. Table 5 shows the results of the evaluation for dynamic surface tensions.

(Measurement of Lightness)

An ink cartridge was filled with each of the inks obtained above, and was mounted on a modified apparatus of an ink jet recording apparatus iP3100 (manufactured by Canon Inc.) in which ink is ejected from a recording head by the action of thermal energy. After that, recording was performed on a recording medium (PR-101; manufactured by Canon Inc.) so that the amount of applied ink per one pixel at a resolution of 600 ppi was 10 ng. The lightness of the resultant image was measured with a Spectrolino (manufactured by Gretag Macbeth) by using a D65 as a light source at a field of view of 2°. Table 5 shows the results of the measurement of the lightness.

TABLE 5

| | | Dynamic surface tension [mN/m] | | | |
|---|---|---|---|---|---|
| | | (1) Lifetime of 50 milliseconds | (2) Lifetime of 500 milliseconds | Δ[(1) − (2)] | Lightness of ink |
| Ink | C1 | 48 | 37 | 13 | 40 |
| | C2 | 47 | 35 | 12 | 40 |
| | C3 | 45 | 38 | 7 | 40 |
| | C4 | 42 | 35 | 7 | 40 |
| | C5 | 42 | 33 | 9 | 40 |
| | M1 | 39 | 37 | 2 | 53 |
| | M2 | 48 | 37 | 13 | 53 |
| | M3 | 39 | 37 | 2 | 53 |
| | M4 | 32 | 31 | 1 | 53 |

TABLE 5-continued

| | Dynamic surface tension [mN/m] | | | |
|---|---|---|---|---|
| | (1) Lifetime of 50 milliseconds | (2) Lifetime of 500 milliseconds | Δ[(1) − (2)] | Lightness of ink |
| M5 | 33 | 32 | 1 | 53 |
| M6 | 36 | 34 | 2 | 53 |
| M7 | 43 | 40 | 3 | 53 |
| M8 | 45 | 41 | 4 | 53 |
| Y1 | 48 | 37 | 13 | 88 |
| Y2 | 40 | 37 | 3 | 88 |
| Y3 | 35 | 33 | 2 | 88 |

As is apparent from Table 5, an ink corresponding to the first ink in the present invention is each of the inks C1 to C5, M2, and Y1. The image formed by using each of the inks corresponding to the first ink in the present invention at a recording duty of 100% on a plain paper had good color uniformity. The recording apparatus and recording medium used in the above image formation was an ink jet recording apparatus iP3100 and PPC paper Office Planner (each manufactured by Canon Inc.).

(Bleeding in Ink Set Having Two Types of Inks)

Ink sets were obtained by using in combination two types of inks selected from the inks C1 to C5, M1 to M8, and Y1 to Y3 obtained above as shown in Table 6 below. Then, as shown in Table 6, between two types of inks included in the ink set, an ink having relatively higher lightness was defined as an ink A, and an ink having relatively lower lightness was defined as an ink B. Table 6 showed the value of lightness of each of the ink A and the ink B, the dynamic surface tension $\gamma_a$ of the ink A at a lifetime of 500 milliseconds, the dynamic surface tension $\gamma_b$ of the ink B at a lifetime of 500 milliseconds, and the difference ($\gamma_a-\gamma_b$) between the dynamic surface tensions.

An ink cartridge was filled with each of the ink A and the ink B of the a plurality of inks included in the ink set, and was mounted on a modified apparatus of an ink jet recording apparatus iP3100 (manufactured by Canon Inc.) in which ink was ejected from a recording head by the action of thermal energy. After that, an image shown in FIG. 1 was formed on a recording medium (PR-101; manufactured by Canon Inc.) in four paths. The resulting recorded matter was visually observed and evaluated for bleeding. Criteria for the evaluation for bleeding are as described below. Table 6 shows the results of the evaluation.

A: No bleeding was observed over the entirety of an image.
B: Bleeding was slightly observed on an image, but the image was at an acceptable level.
C: Bleeding was observed over the entirety of an image.

TABLE 6

| | | Ink set | Ink A Ink | Ink A Lightness | Ink A $\gamma_a$ [mN/m] |
|---|---|---|---|---|---|
| Example | 1 | M1 | C1 | M1 | 53 | 37 |
| | 2 | M2 | C1 | M2 | 53 | 37 |
| | 3 | M3 | C1 | M3 | 53 | 37 |
| | 4 | M5 | C1 | M5 | 53 | 32 |
| | 5 | M6 | C1 | M6 | 53 | 34 |
| | 6 | M7 | C1 | M7 | 53 | 40 |
| | 7 | M4 | C2 | M4 | 53 | 31 |
| | 8 | M5 | C2 | M5 | 53 | 32 |
| | 9 | Y1 | M1 | Y1 | 88 | 37 |
| | 10 | Y1 | M2 | Y1 | 88 | 37 |

TABLE 6-continued

| | 11 | Y2 | M2 | Y2 | 88 | 37 |
|---|---|---|---|---|---|---|
| | 12 | Y3 | M2 | Y3 | 88 | 33 |
| | 13 | Y1 | M3 | Y1 | 88 | 37 |
| | 14 | Y1 | M6 | Y1 | 88 | 37 |
| | 15 | Y1 | M7 | Y1 | 88 | 37 |
| | 16 | Y1 | M8 | Y1 | 88 | 37 |
| | 17 | Y1 | C1 | Y1 | 88 | 37 |
| | 18 | Y2 | C2 | Y2 | 88 | 37 |
| | 19 | Y3 | C1 | Y3 | 88 | 33 |
| | 20 | M1 | C3 | M1 | 53 | 37 |
| | 21 | M1 | C4 | M1 | 53 | 37 |
| | 22 | M6 | C5 | M6 | 53 | 34 |
| Comparative Example | 1 | M4 | C1 | M4 | 53 | 31 |
| | 2 | M8 | C1 | M8 | 53 | 41 |
| | 3 | M7 | C2 | M7 | 53 | 40 |
| | 4 | Y1 | N5 | Y1 | 88 | 37 |

| | | | Ink B Ink | Ink B Lightness | $\gamma_b$ [mN/m] | $\gamma_a - \gamma_b$ [mN/m] | Evaluation for bleeding |
|---|---|---|---|---|---|---|---|
| Example | 1 | | C1 | 40 | 37 | 0 | A |
| | 2 | | C1 | 40 | 37 | 0 | A |
| | 3 | | C1 | 40 | 37 | 0 | A |
| | 4 | | C1 | 40 | 37 | −5 | B |
| | 5 | | C1 | 40 | 37 | −3 | A |
| | 6 | | C1 | 40 | 37 | 3 | A |
| | 7 | | C2 | 40 | 35 | −4 | B |
| | 8 | | C2 | 40 | 35 | −3 | A |
| | 9 | | M1 | 53 | 37 | 0 | A |
| | 10 | | M2 | 53 | 37 | 0 | A |
| | 11 | | M2 | 53 | 37 | 0 | A |
| | 12 | | M2 | 53 | 37 | −4 | B |
| | 13 | | M3 | 53 | 37 | 0 | A |
| | 14 | | M6 | 53 | 34 | 3 | A |
| | 15 | | M7 | 53 | 40 | −3 | A |
| | 16 | | M8 | 53 | 41 | −4 | B |
| | 17 | | C1 | 40 | 37 | 0 | A |
| | 18 | | C2 | 40 | 35 | 2 | A |
| | 19 | | C1 | 40 | 37 | −4 | B |
| | 20 | | C3 | 40 | 38 | −1 | A |
| | 21 | | C4 | 40 | 35 | 2 | A |
| | 22 | | C5 | 40 | 33 | 1 | A |
| Comparative Example | 1 | | C1 | 40 | 37 | −6 | C |
| | 2 | | C1 | 40 | 37 | 4 | C |
| | 3 | | C2 | 40 | 35 | 5 | C |
| | 4 | | M5 | 53 | 32 | 5 | C |

As is apparent from Table 6, in each of Examples 1 to 3, 5, 6, 8 to 11, 13 to 15, 17, 18, and 20 to 22 where the value of $\gamma_a-\gamma_b$ was from −3 or more to 3 or less, an image was at an excellent level because no bleeding was observed over the entirety of the image. In addition, in each of Examples 4, 7, 12, 16, and 19 where the value of $\gamma_a-\gamma_b$ was from −5 or more to less than −3, an image was at an acceptable level because, while bleeding was observed on part of the image, the degree of the bleeding was slight. On the other hand, in each of Comparative Examples 1 to 4 where the value of $\gamma_a-\gamma_b$ was in excess of 3 or less than −5, an image was at an unacceptable level because bleeding was observed over the entirety of the image.

Upon concentrating attention on the inks M8, C1, and Y1 of all the inks. The ink M8 has a dynamic surface tension of 41 mN/m at 500 milliseconds while each of the inks C1 and Y1 has a dynamic surface tension of 37 mN/m at 500 milliseconds. In the combination of the inks M8 and C1 (Comparative Example 2), an image was at an unpreferable level because bleeding was observed over the entirety of the image. In contrast, in the combination of the inks M8 and Y1 (Example 16), an image was at an acceptable level, though bleeding was slightly observed on part of the image. As for the combination of the inks M8 and C1, and the combination of the inks M8 and Y1, the absolute values of the differences in dynamic surface tension at 500 milliseconds between the inks were 4 for both of them, but the extents to which bleeding occurred owing to a lightness relationship between the inks were different from each other.

The relationship between the value of $\gamma_a-\gamma_b$ and bleeding in a combination of two types of inks did not depend on the type or content of a penetrant (a surfactant and/or a water-soluble organic compound) to be used in each ink.

(Bleeding in Ink Set Including Three Types of Inks)

An ink set was obtained by using in combination three types of inks selected from the inks C1, C2, M1, M2, M4, and Y1 to Y3 obtained above as shown in Table 7 below. Then, as shown in Table 7, for each of all (three) combinations of two types of inks selected from the three types of inks included in the ink set, an ink having relatively higher lightness was defined as an ink A, and an ink having relatively lower lightness was defined as an ink B. The following are shown in Table 7: the value of lightness of each of the ink A and the ink B, the dynamic surface tension $\gamma_a$ of the ink A at a lifetime of 500 milliseconds, the dynamic surface tension $\gamma_b$ of the ink B at a lifetime of 500 milliseconds, and the difference ($\gamma_a-\gamma_b$) between the dynamic surface tensions.

An ink cartridge was filled with each of the ink A and the ink B of the a plurality of inks included in the ink set, and was mounted on a modified apparatus of an ink jet recording apparatus iP3100 (manufactured by Canon Inc.) in which ink was ejected from a recording head by the action of thermal energy. After that, an image shown in FIG. 1 was formed on a recording medium (PR-101; manufactured by Canon Inc.) in four paths. A recorded matter obtained by using each of all (three) combinations of two types of inks selected from the three types of the inks included in the ink set, was visually observed and evaluated for bleeding. Criteria for the evaluation for bleeding are as described below. Table 7 shows the results of the evaluation.

A: No bleeding was observed over the entirety of an image.
B: Bleeding was slightly observed on part of an image, but the image was at an acceptable level.
C: Bleeding was observed over the entirety of an image.

In addition, a recorded matter obtained by using each of all (three) combinations of two types of inks selected from three types of inks included in an ink set was visually observed, and comprehensive evaluation for bleeding in each of the ink sets was performed. Criteria for the comprehensive evaluation for bleeding are as described below. Table 7 shows the results of the evaluation.

A: No bleeding was observed over the entirety of an image in any combination of inks.
B: Bleeding was slightly observed on part of an image in some combinations of inks, but the image is at an acceptable level.
C: Bleeding was observed over the entirety of an image in some combinations of inks.

TABLE 7

| | | | | Ink A | | | |
|---|---|---|---|---|---|---|---|
| | Ink set | | | Combination of two types | | Ink | Lightness | $\gamma_a$ [mN/m] |
| Example 23 | C2 | M2 | Y1 | C2 | M2 | M2 | 53 | 37 |
| | | | | M2 | Y1 | Y1 | 88 | 37 |
| | | | | C2 | Y1 | Y1 | 88 | 37 |
| Example 24 | C1 | M1 | Y1 | C1 | M1 | M1 | 53 | 37 |
| | | | | M1 | Y1 | Y1 | 88 | 37 |
| | | | | C1 | Y1 | Y1 | 88 | 37 |
| Example 25 | C2 | M4 | Y3 | C2 | M4 | M4 | 53 | 31 |
| | | | | M4 | Y3 | Y3 | 88 | 33 |
| | | | | C2 | Y3 | Y3 | 88 | 33 |
| Reference Example 1 | C2 | M4 | Y2 | C2 | M4 | M4 | 53 | 31 |
| | | | | M4 | Y2 | Y2 | 88 | 37 |
| | | | | C2 | Y2 | Y2 | 88 | 37 |

| | Ink B | | | | Evaluation for bleeding | Comprehensive evaluation for bleeding |
|---|---|---|---|---|---|---|
| | Ink | Lightness | $\gamma_b$ [mN/m] | $\gamma_a-\gamma_b$ [mN/m] | | |
| Example 23 | C2 | 40 | 35 | 2 | A | A |
| | M2 | 53 | 37 | 0 | A | |
| | C2 | 40 | 35 | 2 | A | |
| Example 24 | C1 | 40 | 37 | 0 | A | A |
| | M1 | 53 | 37 | 0 | A | |
| | C1 | 40 | 37 | 0 | A | |
| Example 25 | C2 | 40 | 35 | −4 | B | B |
| | M4 | 53 | 31 | 2 | A | |
| | C2 | 40 | 35 | −2 | A | |
| Reference Example 1 | C2 | 40 | 35 | −4 | B | C |
| | M4 | 53 | 31 | 6 | C | |
| | C2 | 40 | 35 | 2 | A | |

As is apparent from Table 7, the same evaluation as in the case of the above ink set having two types of inks has only to be made for each of all combinations of two types of inks selected from three types of inks included in an ink set. As for Examples 23 and 24 in which the value of $\gamma_a-\gamma_b$ was from −3 or more to 3 or less, in all the combinations of any two types of inks among the three types of inks included in an ink set, an image was at an excellent level because no bleeding was observed over the entirety of the image. In addition, in Example 25 including a combination of two types of inks among the three types of inks included in an ink set where the value of $\gamma_a-\gamma_b$ was −4, the following bleeding performance was exhibited. That is, in a combination of two types of inks where the value of $\gamma_a-\gamma_b$ was −4, an image was at an acceptable level while bleeding was slightly observed on part of the image; and, in the other combinations of two types of inks, no bleeding was observed over the entirety of an image. Accordingly, in Example 25, bleeding was comprehensively at an acceptable level. On the other hand, in Reference Example 1 including a combination of two types of inks among three types of inks included in an ink set where the value of $\gamma_a-\gamma_b$ was 6, bleeding was observed over the entirety of an image in that combination, and the bleeding was comprehensively at an unacceptable level.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-126633, filed May 11, 2007, Japanese Patent Application No. 2008-112758, filed Apr. 23, 2008 which are hereby incorporated by reference herein in their entirety.

What is claimed is:

1. An ink set comprising
   a first aqueous ink comprising a dye; and
   a second aqueous ink comprising a dye,
   wherein the first aqueous ink satisfies the following conditions (1) to (3):
   (1) a dynamic surface tension at a lifetime of 50 milliseconds is from 42 mN/m or more to less than 49 mN/m,
   (2) a dynamic surface tension at a lifetime of 500 milliseconds is from 28 mN/m or more to 38 mN/m or less, and
   (3) a difference between the dynamic surface tension at a lifetime of 50 milliseconds and the dynamic surface tension at a lifetime of 500 milliseconds is 7 mN/m or more, and
   wherein between the first aqueous ink and the second aqueous ink, a dynamic surface tension $\gamma_a$ (mN/m) of an ink A having relatively higher lightness at a lifetime of 500 milliseconds and a dynamic surface tension $\gamma_b$ (mN/m) of an ink B having relatively lower lightness at a lifetime of 500 milliseconds satisfy a relationship of $-5 \leq (\gamma_a - \gamma_b) \leq 3$.

2. The ink set according to claim 1, wherein the ink set comprises at least three aqueous inks each comprising a dye, and
   wherein among any two types of aqueous ink arbitrarily selected from the at least three aqueous inks included in the ink set, the dynamic surface tension $\gamma_a$ (mN/m) of an ink A having relatively higher lightness at a lifetime of 500 milliseconds and the dynamic surface tension $\gamma_b$ (mN/m) of an ink B having relatively lower lightness at a lifetime of 500 milliseconds satisfy a relationship of $-5 \leq (\gamma_a - \gamma_b) \leq 3$.

3. An ink jet recording method comprising ejecting ink by an ink jet method, wherein the ink comprises aqueous inks of which the ink set according to claim 1 is composed.

4. An ink jet recording method according to claim 3, wherein the ink jet method is an ink jet recording method in which the ink is ejected from a recording head by action of thermal energy.

5. An ink cartridge comprising an ink storing portion for storing ink, wherein the ink contained in the ink storing portion is any one of the aqueous inks of which the ink set according to claim 1 is composed.

6. A recording unit, comprising:
   an ink storing portion for storing ink; and
   a recording head for ejecting the ink,
   wherein the ink contained in the ink storing portion comprises the aqueous inks of which the ink set according to claim 1 is composed.

7. An ink jet recording apparatus, comprising:
   an ink storing portion for storing ink; and
   a recording head for ejecting the ink,
   wherein the ink contained in the ink storing portion comprises the aqueous inks of which the ink set according to claim 1 is composed.

8. The ink set according to claim 1, wherein the first aqueous ink further comprises polyoxyethylene alkyl ether.

9. The ink set according to claim 8, wherein the polyoxyethylene alkyl ether is at least one selected from the group consisting of surfactants each represented by the following general formula (1) and surfactants each represented by the following general formula (2):

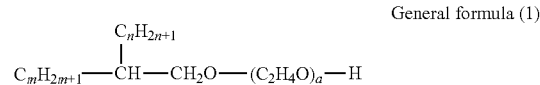
General formula (1)

wherein m, n, and a each independently represent an integer of 1 or more, and m+n is an integer of from 14 to 20,

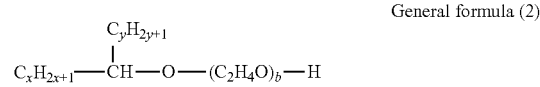
General formula (2)

wherein x, y, and b each independently represent an integer of 1 or more, and x+y is an integer of from 15 to 21.

10. The ink set according to claim 8, wherein the HLB value of the polyoxyethylene alkyl ether according to the Griffin method is from 12.0 or more to 16.5 or less.

11. The ink set according to claim 8, wherein the content of the polyoxyethylene alkyl ether is 0.30% by mass or more and 2.0% by mass or less based on the total mass of the first aqueous ink.

12. The ink set according to claim 1, wherein the second aqueous ink comprises (1) at least one surfactant selected from the group consisting of polyoxyethylene alkyl ether and an ethylene oxide adduct of acetylene glycol or (2) at least one water-soluble organic compound selected from the group consisting of ethanol, 2-propanol, 1,2-pentanediol, 1,5-pentanediol, 1,2-hexanediol, and 1,6-hexanediol.

13. The ink set according to claim 1, wherein the second aqueous ink comprises a surfactant in a content of 0.10% by mass or more and 2.0% by mass or less based on the total mass of the second aqueous ink.

14. A first aqueous ink to be used for an ink set having at least two aqueous inks each comprising a dye,
    wherein the first aqueous ink satisfies the following conditions (1) to (3):
    (1) a dynamic surface tension at a lifetime of 50 milliseconds is from 42 mN/m or more to less than 49 mN/m,
    (2) a dynamic surface tension at a lifetime of 500 milliseconds is from 28 mN/m or more to 38 mN/m or less, and
    (3) a difference between the dynamic surface tension at a lifetime of 50 milliseconds and the dynamic surface tension at a lifetime of 500 milliseconds is 7 mN/m or more, and
    wherein between the first aqueous ink and at least one other aqueous ink of the at least two aqueous inks, a dynamic surface tension $\gamma_a$ (mN/m) of an ink A having relatively higher lightness at a lifetime of 500 milliseconds and a dynamic surface tension $\gamma_b$ (mN/m) of an ink B having relatively lower lightness at a lifetime of 500 milliseconds satisfy a relationship of $-5 \leq (\gamma_a - \gamma_b) \leq 3$.

* * * * *